(12) United States Patent
Kim

(10) Patent No.: US 10,349,137 B2
(45) Date of Patent: Jul. 9, 2019

(54) DEVICE AND METHOD FOR RECOMMENDING CONTENT AND SOUND SOURCE

(71) Applicant: GROOVERS Inc., Seongnam-si (KR)

(72) Inventor: Min-Soeng Kim, Seoul (KR)

(73) Assignee: GROOVERS INC., Seongnam-si (KR)

( * ) Notice: Subject to any disclaimer, the term of this patent is extended or adjusted under 35 U.S.C. 154(b) by 0 days.

(21) Appl. No.: 14/898,393

(22) PCT Filed: Nov. 21, 2014

(86) PCT No.: PCT/KR2014/011263
§ 371 (c)(1),
(2) Date: Dec. 14, 2015

(87) PCT Pub. No.: WO2015/129989
PCT Pub. Date: Sep. 3, 2015

(65) Prior Publication Data
US 2016/0142775 A1 May 19, 2016

(30) Foreign Application Priority Data

Feb. 26, 2014 (KR) .................. 10-2014-0022928
Mar. 27, 2014 (KR) .................. 10-2014-0036322

(51) Int. Cl.
*H04N 21/466* (2011.01)
*H04H 60/65* (2008.01)
(Continued)

(52) U.S. Cl.
CPC ........ *H04N 21/4668* (2013.01); *H04H 60/31* (2013.01); *H04H 60/43* (2013.01);
(Continued)

(58) Field of Classification Search
CPC combination set(s) only.
See application file for complete search history.

(56) References Cited

U.S. PATENT DOCUMENTS 9,906,827 B2 * 2/2018 Riedl ............... H04N 21/23424
2004/0123324 A1 * 6/2004 Sazzad ............ H04N 7/17318
725/89

(Continued)

FOREIGN PATENT DOCUMENTS

JP 2006309751 A 11/2006
JP 2008011365 A 1/2008
(Continued)

OTHER PUBLICATIONS

International Search Report for PCT/KR2014/011263 dated Feb. 16, 2015.

*Primary Examiner* — Alexander Gee
(74) *Attorney, Agent, or Firm* — Brinks Gilson & Lione

(57) ABSTRACT

The present invention relates to a device and a method for recommending content and a sound source. The present invention, especially in a multimedia device such as a TV which can be used by a plurality of users, can generate channel groups in accordance with channel properties, can recommend appropriate content for each channel group by analyzing users' viewing history type for each channel group, and can acquire user's intent on the basis of user's use history of a sound source, lyrics and music information of the sound source, and the like, thereby providing, on the basis of the user's intent, sound source recommendation information and various reasons for sound source recommendation with respect to the sound source recommendation information.

6 Claims, 22 Drawing Sheets

(51) Int. Cl.
*H04H 60/43* (2008.01)
*H04H 60/31* (2008.01)
*H04H 60/45* (2008.01)
*H04N 21/482* (2011.01)
*H04N 21/84* (2011.01)
*H04N 21/439* (2011.01)
*H04N 21/258* (2011.01)
*H04N 21/25* (2011.01)
*H04N 21/45* (2011.01)

(52) U.S. Cl.
CPC ............ *H04H 60/45* (2013.01); *H04H 60/65* (2013.01); *H04N 21/252* (2013.01); *H04N 21/25891* (2013.01); *H04N 21/4394* (2013.01); *H04N 21/45* (2013.01); *H04N 21/4821* (2013.01); *H04N 21/4826* (2013.01); *H04N 21/84* (2013.01)

(56) References Cited

U.S. PATENT DOCUMENTS

| | | | |
|---|---|---|---|
| 2009/0132905 | A1 | 5/2009 | Hoshino |
| 2010/0125544 | A1 | 5/2010 | Lee et al. |
| 2012/0180090 | A1* | 7/2012 | Yoon .................. H04N 5/445 725/45 |
| 2012/0240177 | A1* | 9/2012 | Rose .................. H04N 21/252 725/116 |
| 2012/0284753 | A1* | 11/2012 | Roberts ............ H04N 21/41407 725/45 |
| 2014/0223480 | A1* | 8/2014 | Berry ................ H04N 21/4668 725/40 |
| 2016/0219322 | A1* | 7/2016 | Riedl ............... H04N 21/23424 |

FOREIGN PATENT DOCUMENTS

| | | |
|---|---|---|
| JP | 2012150244 A | 8/2012 |
| KR | 1020080002348 A | 1/2008 |
| KR | 100845233 B1 | 7/2008 |
| KR | 1020100024769 A | 3/2010 |
| KR | 100955523 B1 | 4/2010 |
| KR | 1020100055712 A | 5/2010 |
| KR | 1020100133788 A | 12/2010 |
| KR | 1020110071715 A | 6/2011 |
| KR | 1020120080985 A | 7/2012 |
| KR | 1020130090042 A | 8/2013 |

* cited by examiner

| CHANNEL ID | CHANNEL INFORMATION | BROADCAST CONTENT | CONTENT INFORMATION |
|---|---|---|---|
| CHANNEL #1 | CHANNEL NAME, CHANNEL DESCRIPTION, GENRE | MOVIE,#1, MOVIE,#2, MOVIE,#3 | MOVIE#1, MOVIE TITLE, ACTOR, DIRECTOR, SYNOPSIS |
| CHANNEL #2 | CHANNEL NAME, CHANNEL DESCRIPTION, GENRE | ANIMATION#1, ANIMATION#2, EARLY CHILDHOOD EDUCATION#1 | ANIMATION#1: ANIMATION TITLE, CHARACTER, PRODUCER |
| CHANNEL #3 | CHANNEL NAME, CHANNEL DESCRIPTION, GENRE | MOVIE#3, MOVIE#5, MOVIE#6, DRAMA#2 | MOVIE#5: MOVIE TITLE, ACTOR, DIRECTOR, SYNOPSIS |
| ... | ... | ... | ... |
| CHANNEL #N | CHANNEL NAME, CHANNEL DESCRIPTION, GENRE | DRAMA#1, DRAMA#2, DRAMA#3 | DRAMA#1: DRAMA TITLE, ACTOR, DIRECTOR, SYNOPSIS |

DEVICE AND METHOD FOR RECOMMENDING CONTENT AND SOUND SOURCE

CROSS REFERENCE TO RELATED APPLICATIONS

This application claims the benefit of Korean Patent Application Nos. 10-2014-0022928, filed Feb. 26, 2014 and 10-2014-0036322, filed Mar. 27, 2014, in the Korean Patent and Trademark Office. Further, this application is the National Phase application of International Application No. PCT/KR2014/011263 filed on Nov. 21, 2014, which are hereby incorporated by reference in their entirety into this application.

TECHNICAL FIELD

The present invention generally relates to a device and method for recommending content and sound sources and, more particularly, to a device and method for recommending content and sound sources, which can generate channel groups based on channel attributes in a single multimedia device that can be used by multiple users, such as a television (TV), analyze viewing history patterns of users for respective channel groups, and recommend pieces of content suitable for respective channel groups, and which can determine a user's intent based on the history of use of sound sources by the user, information about the lyrics and scores of sound sources, etc. and provide sound source recommendation information and various reasons for the sound source recommendation information depending on the user's intent.

BACKGROUND ART

Unlike a device continuously used by a specific person, as in the case of a mobile terminal such as a smart phone, services adopting TVs as a medium, such as a cable TV, an Internet Protocol TV (IPTV), and satellite broadcasting, are configured such that various members constituting a household use a single device. In this situation, individual members may occasionally gather and view the same content in the same time slot, but they generally have different content preferences, and thus view different types of content in different time slots.

A typical personalization/recommendation algorithm, such as association rule mining, analyzes the usage form or pattern of each individual and provides content suitable for the individual's preferences. However, when multiple users use the same service in common using a single device as a medium, as in the case of a TV, there arises first the need to specify each individual. For this, in general, methods for receiving the profiles of individual users who intend to currently use a TV via a separate user interface have been attempted. However, the methods are inconvenient from the standpoint of usability, and in reality it is difficult to induce users to designate their profiles every time they use a TV.

Further, in the case where preference information is generated using viewing information generated in a household and content is recommended depending on the preference information, a problem may arise in that content that is not of interest to the household members who actually use the corresponding TV is recommended. For example, when multiple users view a single device such as a TV, viewing patterns may vary in respective time slots every day. That is, patterns may appear in which, in the morning, beauty- or drama-related programs chiefly viewed by housewives are mainly viewed, in the afternoon, programs for children are mainly viewed, and in the evening and night time, sports programs or movies are viewed. When such patterns are integrated into a usage history for a single device and association rule mining or the like is performed, a problem may occur wherein adult programs are recommended to users who view programs for children, such as animations.

Further, such technology may be used to recommend sound source data to sound source users. However, considering the reality in which a large number of pieces of music are released every day, it is difficult for each sound source user to search for sound sources suitable for his or her preference when using sound source data as his or her ringtone, ringback tone or the like, or downloading the sound source data to his or her MP3 player or the like.

To solve this problem, there has been proposed a type of service that classifies pieces of music via the analysis of audio data, and then allows sound source users to more easily select music suitable for their preferences. However, most existing music recommendation technologies adopt techniques for selecting and analyzing only a partial section of sound source data due to the problem of low efficiency arising when an entire musical composition is analyzed. Further, since existing music recommendation technologies merely recommend sound sources based only on pieces of music selected or listened to by a sound source user, there may frequently occur the case where sound sources unsuitable for the sound source user's preference are recommended.

As related preceding technologies, there are Korean Patent Application Publication No. 10-2011-0071715 (Date of publication: Jun. 29, 2011) (entitled "System of IPTV service for providing community service") and Korean Patent Application Publication No. 10-2008-000234 (Date of publication: Jan. 4, 2008) (entitled "System and method for recommending music").

DISCLOSURE

Technical Problem

As described above, an object of the present invention is to provide a content recommendation device and method, which can classify individual channels, broadcasted on a device such as a TV, into channel groups and recommend suitable content for each channel group, thus recommending content suitable for each of multiple users who use the device without requiring each individual user to input his or her profile or the like.

Another object of the present invention is to provide a sound source recommendation device and method, which determine the intent of each sound source user using the sound source usage history of the sound source user and information about the lyrics and scores of sound sources used by the user, and personalize recommended sound sources based on the determined user's intent.

A further object of the present invention is to provide a sound source recommendation device and method, which not only recommend personalized sound sources to each sound source user, but also provide a reason for recommending the sound sources based on various criteria.

Technical Solution

In accordance with an embodiment of the present invention to accomplish the above objects, there is provided a content recommendation device, including a channel group generation unit for calculating a similarity between channels, based on attribute information of the channels, and generating one or more channel groups using the calculated similarity between the channels; a viewing history conversion unit for converting content viewing history information for each user group into viewing history information for each of the channel groups; and a recommendation information generation unit for generating content recommendation information for each channel group for each user group, based on the viewing history information for each channel group.

The content recommendation device may further include a broadcast information collection unit for collecting broadcast information including one or more of Electronic Program Guide (EPG) information for each channel, meta-information for each channel, meta-information of content broadcasted on each channel, and web information; a channel attribute generation unit for generating attribute information of each channel using the collected broadcast information; and a recommendation information provision unit for providing content recommendation information for each channel group, generated for each user group, to the user group.

The channel group generation unit may check information about overlap between pieces of content on the channels using the collected broadcast information, and calculates the similarity between the channels, further based on the content overlap information.

The content overlap information may include one or more of information about whether pieces of content on the channels overlap each other, and information about a number of pieces of overlapping content.

The content recommendation device may further include a content belongingness calculation unit for calculating belongingness of pieces of content broadcasted on respective channels to the respective channels, wherein the channel group generation unit updates a relationship between the generated channel groups, based on the calculated content belongingness, and wherein the content belongingness calculation unit calculates belongingness of the content to each channel based on association information between an attribute of each channel and a type of content broadcasted on the channel.

The channel group generation unit may be configured to compare the calculated similarity between the channels with a preset threshold, and merge the channels into one or more channel groups based on a result of the comparison, and when any one channel belongs to two or more channel groups as a result of generating the channel groups, generate an upper channel group for the two or more channel groups.

The recommendation information generation unit may calculate a content preference for each channel group based on the viewing history information for each channel group, and generate content recommendation information for each channel group based on the calculated content preference.

The recommendation information provision unit may provide content recommendation information for a channel group, to which a channel currently selected by each user group belongs, to the corresponding user group.

The recommendation information provision unit may provide content recommendation information for a channel group, on which content similar to content currently being viewed by each user group is broadcasted, to the corresponding user group, based on the belongingness of the content to each channel.

Further, a content recommendation method according to an embodiment of the present invention includes calculating a similarity between channels, based on attribute information of the channels; generating one or more channel groups using the calculated similarity between the channels; converting content viewing history information for each user group into viewing history information for each of the channel groups; and generating content recommendation information for each channel group for each user group, based on the viewing history information for each channel group.

Furthermore, a sound source recommendation device according to an embodiment of the present invention includes a sound source information extraction unit for extracting sound source information that includes one or more of lyrics information, chord information, and melody/rhythm information of each sound source, based on sound source listening history information of a user; an intent generation unit for generating the user's intent information based on the extracted sound source information; and a sound source recommendation unit for providing one or more recommendation sound sources to the user using the intent information.

The sound source recommendation device may further include a sound source history information collection unit for collecting sound source listening history information that includes one or more of titles of sound sources listened to by the user during a predetermined period, and a number of times each sound source was listened to.

The sound source information extraction unit may be configured to calculate a number of sound sources listened to by the user based on the collected sound source listening history information, and is configured to, when the calculated number of sound sources listened to by the user is less than a preset reference value, extract one or more similar users for the user, extract the sound source information based on sound source listening history information collected for the extracted similar users, and extract one or more similar users based on a extent of overlap between the sound sources listened to by the user and sound sources listened to by other users.

The intent information may include one or more of a lyrical preference, a theme preference, a chord change preference, a melody/rhythm change preference, and an artist/genre preference, and the intent generation unit may include a keyword extraction unit for extracting one or more keywords from lyrics of each sound source listened to by the user using the lyrics information; a lyrical preference calculation unit for obtaining, for each of the extracted one or more keywords, one or more of a first frequency at which the keyword appears in all sound sources listened to by the user, and a second frequency at which the keyword appears in a highlight or a refrain of each sound source listened to by the user, and calculating the lyrical preference based on one or more of the obtained first and second frequencies; a theme preference calculation unit for obtaining frequencies of appearance of the extracted one or more keywords for respective themes, based on theme-based word association information that has been constructed in advance for all sound sources, and calculating the theme preference based on the obtained appearance frequencies for respective themes; a chord change extraction unit for extracting information about one or more chord changes based on the chord information; a chord change preference calculation unit for obtaining a frequency at which each of the extracted chord changes appears in all sound sources listened to by the user, and calculating the chord change preference based on the obtained chord change frequency; a melody/rhythm change extraction unit for extracting information about one or more melody/rhythm changes based on the melody/rhythm information; and a melody/rhythm change preference calculation unit for obtaining a frequency at which each of the extracted melody/rhythm changes appears in all sound sources listened to by the user, and calculating the melody/rhythm change preference based on the calculated melody/rhythm change information.

The lyrical preference calculation unit may determine weights to be assigned to the extracted one or more keywords based on the calculated second frequency, and assign the determined weights to one or more of the first frequency and the second frequency, thus calculating the lyrical preference.

The chord change preference calculation unit may assign weights to obtained frequencies of respective chord changes based on a number of chords included in each of the extracted one or more pieces of chord change information, thus calculating the chord change preference.

The sound source recommendation unit may include a recommendation sound source determination unit for selecting one or more recommendation sound sources from among all sound sources, based on one or more of the user's intent information and similarities between pieces of intent information of multiple users; an exposure ranging determination unit for determining exposure ranking of one or more recommendation sound sources using the intent information of the user; a recommendation sound source provision unit for aligning the one or more recommendation sound sources based on the determined exposure ranking, and providing the aligned recommendation sound sources to the user; and a recommendation reason provision unit for further providing a reason for recommending the one or more recommendation sound sources when providing the one or more recommendation sound sources to the user.

Furthermore, a sound source recommendation method according to an embodiment of the present invention includes extracting sound source information that includes one or more of lyrics information, chord information, and melody/rhythm information of each sound source, based on sound source listening history information of a user; generating the user's intent information based on the extracted sound source information; and providing one or more recommendation sound sources to the user using the intent information.

As another means for accomplish the objects of the present invention, there is provided a computer-readable storage medium storing a program for executing the method.

Advantageous Effects

In accordance with the present invention, when multiple users use the same device, as in the case of TV, IPTV, CSTV, or OTT services, each user may be recommended suitable content for his or her preferred channel group based on the patterns of viewing histories for respective groups of channels broadcasted on the device.

Further, the present invention may improve user convenience because individual users do not need to perform unnecessary interaction, such as the input of profile information or the like, in order to receive preferred content recommendations.

Furthermore, the present invention may determine each sound source user's intent using a sound source usage history and information about the lyrics and scores of the sound sources for each sound source user, and may personalize recommended sound sources based on the determined user's intent, thus allowing the user to receive recommendations for sound sources suitable for his or her preferences.

Furthermore, the present invention not only recommends personalized sound sources to each sound source user, but also provides the reason for recommending the sound sources to the sound source user based on various criteria, thus allowing the user to easily know the reason why the corresponding sound sources are recommended.

Furthermore, the present invention may use a distributed processing system to effectively handle the burden of storage and computational load associated with the large amount of data required to generate the intent information of a user.

DESCRIPTION OF DRAWINGS

FIG. 3 is a diagram showing an example of broadcast information collected by the content recommendation device according to an embodiment of the present invention;

BEST MODE

Figure 1:
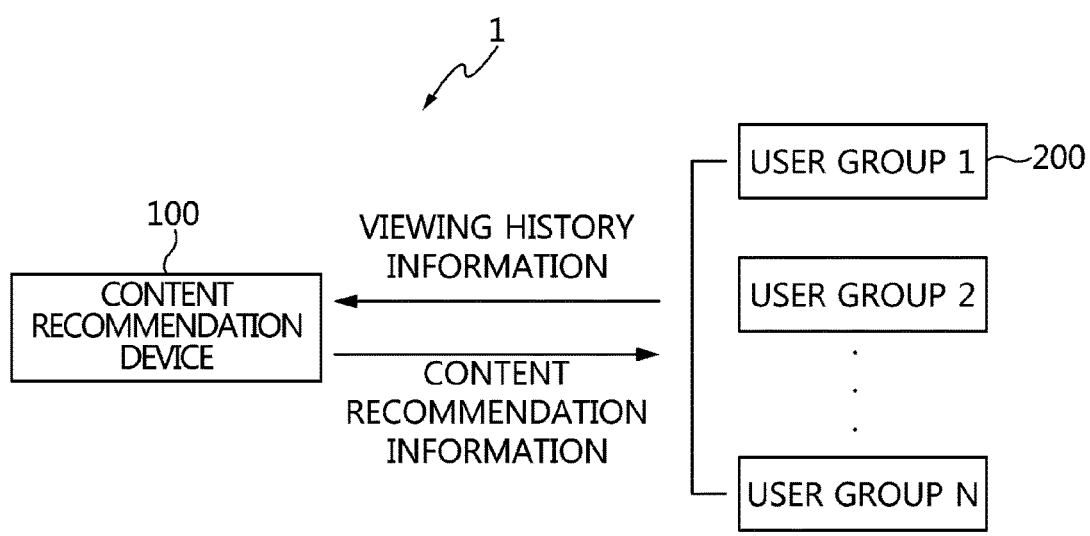
FIG. 1 is a diagram showing a content recommendation system according to an embodiment of the present invention.

The present invention is described in detail below with reference to the accompanying drawings illustrating preferred embodiments of the present invention. Detailed descriptions of known functions or configurations which have been deemed to make the gist of the present invention unnecessarily obscure will be omitted below in the following description and attached drawings. It should be noted that the same reference numerals are used to designate the same or similar elements throughout the drawings.

The terms and words used in the present specification and claims should not be interpreted as being limited to their typical meaning based on the dictionary definitions thereof, but should be interpreted as having the meaning and concept relevant to the technical spirit of the present invention, on the basis of the principle by which the inventor can suitably define the implications of terms in the way which best describes the invention. Meanwhile, the configurations described in the present specification and the configurations illustrated in the drawings are merely preferred embodiments of the present invention and do not exhaustively present the technical spirit of the present invention. Accordingly, it should be appreciated that there may be various equivalents and modifications that can replace the embodiments and the configurations at the time at which the present application is filed. The terms such as "first" and "second" may be used to describe various components and are intended to merely distinguish one component from other components and are not intended to limit the components.

Hereinafter, a terminal according to embodiments of the present invention is not limited to a mobile communication terminal and the present invention may be applied to any of various terminals, such as all information and communication devices, multimedia terminals, wired terminals, fixed terminals, and Internet Protocol (IP) terminals. Further, the terminals may be advantageously utilized in the case where they are mobile terminals having various mobile communication specifications, such as a mobile phone, a Portable Multimedia Player (PMP), a Mobile Internet Device (MID), a smart phone, a desktop PC, a table PC, a notebook computer, a Netbook, and an information and communication device.

FIG. 1 is a diagram showing a content recommendation system according to an embodiment of the present invention.

Referring to FIG. 1, a content recommendation system 1 according to an embodiment of the present invention may include a content recommendation device 100 and one or more user groups 200.

Each of the user groups 200 may be composed of multiple users who use a single multimedia device. Here, the multimedia device may include devices for providing a Video-On-Demand (VOD) service, such as a cable TV, an IPTV, a Cloud Streaming TV (CSTV), and an Over The Top (OTT) service, which are installed in a specific place (e.g. single home) and are used by multiple members. Here, CSTV denotes a scheme in which a control screen or video change content is processed by a server without requiring a set-top box, and a client receives, in real time, only the screen generated by the server via access to the Internet. Further, OTT service denotes a kind of Internet video service.

The content recommendation device 100 may collect broadcast information from an Electronic Program Guide (EPG), web information, channel information, etc. For example, the broadcast information may be obtained by collecting program names, program descriptions, and meta-information provided for each channel, which are collected from the EPG, broadcast information disclosed on the web, and the meta-information of content broadcasted on each channel.

When such broadcast information is collected in this way, the content recommendation device 100 may define the attributes of respective channels using the collected broadcast information. Further, when the attributes of respective channels are defined, channels having similar attributes are classified as a single channel group, and then content recommendation information may be generated for each channel group.

Further, the content recommendation device 100 may collect viewing history information from each user group 200. Here, the collected viewing history information may include channel information for each user group 200 and information about pieces of content viewed on each channel.

When viewing history information is collected from each user group, the content recommendation device 100 may convert the collected viewing history information into a viewing history for each channel group, generate recommendation content information for each channel group, and provide the generated information to the user groups 200.

Here, when a specific user belonging to a specific user group 200 selects a channel to be viewed, the content recommendation device 100 may provide recommendation content information for a channel group corresponding to the selected channel. Alternatively, the content recommendation device 100 may provide recommendation content that is generated for another channel group to which the current specific channel does not belong, based on the similarity to the content currently being viewed by a specific user on the current specific channel.

The content recommendation device 100 according to the embodiment will be described in greater detail with reference to FIG. 2 and subsequent drawings. Hereinafter, for the convenience of description, a TV installed in each user group will be described as an example.

Figure 2:
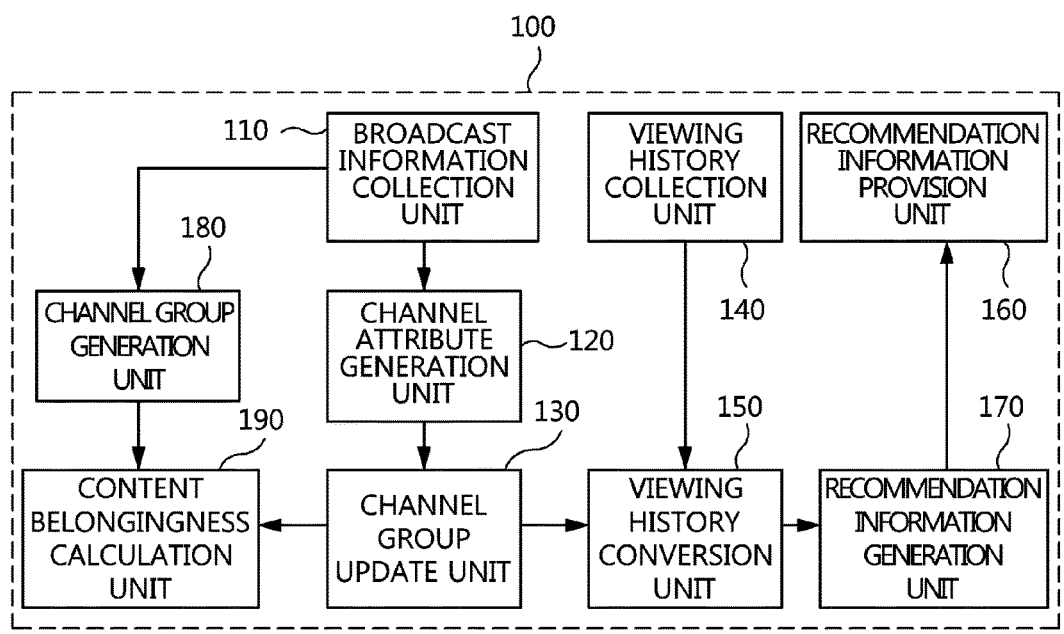
FIG. 2 is a block diagram showing an example of the content recommendation device shown in FIG. 1.
Figure 4:
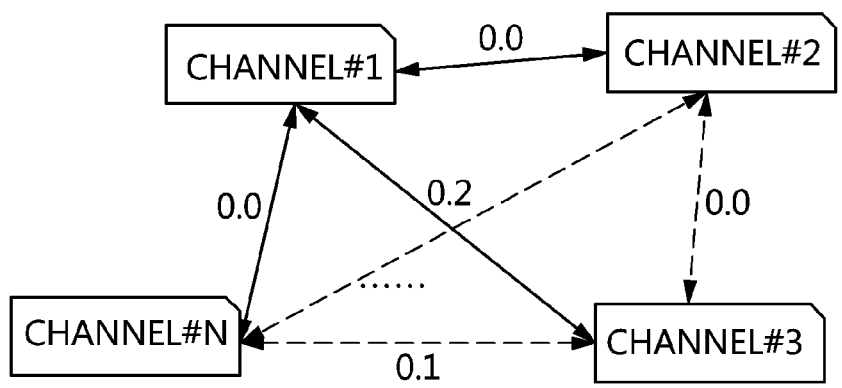
FIG. 4 is a diagram showing an example in which the content recommendation device calculates the similarity between channels according to an embodiment of the present invention.

FIG. 2 is a block diagram showing an example of the content recommendation device shown in FIG. 1. FIG. 3 is a diagram showing an example of broadcast information collected by the content recommendation device according to an embodiment of the present invention. FIG. 4 is a diagram showing an example in which the content recommendation device calculates the similarity between channels according to an embodiment of the present invention.

Referring to FIG. 2, the content recommendation device 100 includes a broadcast information collection unit 110, a channel attribute generation unit 120, a channel group generation unit 130, a viewing history collection unit 140, a viewing history conversion unit 150, a recommendation information generation unit 160, a recommendation information provision unit 170, a content belongingness calculation unit 180, and a channel group update unit 190.

The broadcast information collection unit 110 may provide broadcast information from an EPG, a web, channel meta-information, content meta-information, etc. For example, as illustrated in FIG. 3, broadcast information 10 may be collected, and may include broadcast content names, broadcast content descriptions, channel information such as genres, channel names, and channel descriptions, obtained from the EPG and the meta-information of channels, and content names, actors, directors, synopses, and producers, obtained from broadcast information disclosed on the web and the meta-information of content broadcasted on each channel.

The channel attribute generation unit 120 may define the attributes of respective channels using the collected broadcast information and generate pieces of attribute information about respective channels. In this case, the attributes of the channels may be classified into "movie channel", "drama channel", "kids' channel", "education channel", "business channel", "news channel", etc.

For example, referring to the broadcast information 10 illustrated in FIG. 3, channel #1 and channel #3 are used to broadcast movies as principal content, and thus they may be defined as "movie channels". Similarly, since channel #2 is used mainly to broadcast content such as children's animations and early childhood educational content, it may be defined as a "kids' channel", and channel #N may be defined as a "drama channel".

When the attribute of each channel is defined, the channel group generation unit 130 may calculate the similarity between individual channels using the defined channel attribute information. Here, N(N−1)/2 similarities may be calculated for N channels, and similarities may be calculated using a Jaccard similarity or cosine similarity calculation technique.

When a description is made with reference to FIGS. 3 and 4 by way of example, among the pieces of content broadcasted on channel #1 and channel #3 in FIG. 3, only movie #3 is common to both, and thus it may be considered that the extent of content overlap between channels #1 and #3 is relatively low. However, since the channel attributes defined for both channel #1 and channel #3 are "movie channels", the similarity between channels #1 and #3 may be calculated as a relatively high value, as shown in FIG. 4.

In addition, the channel group generation unit 130 may check information about overlap between pieces of content broadcasted on respective channels, and calculate the similarity further based on the checked content overlap information. Here, the content overlap information may include information about whether content overlaps, and, if the content overlaps, the number of pieces of overlapping content. When the content overlaps, the greater the number of pieces of overlapping content, the higher the calculated similarity value.

For example, since the attributes of channel #3 and channel #N are respectively defined as different attributes, that is, "movie channel" and "drama channel", the similarity therebetween may be calculated as a low value when calculated based on the channel attribute. However, since dramas are broadcasted both on channel #3 and channel #N, and drama #2, one of the broadcasted dramas, is common to both, the similarity may be calculated as a slightly higher value than that of the case where only the channel attribute is used, as shown in FIG. 4.

In this way, the channel group generation unit 130 may more precisely calculate the similarity in consideration not only of the channel attribute information generated for respective channels, but also of the overlap information for pieces of content that are broadcasted on the respective channels.

Further, as shown in FIG. 4, when similarities between respective channel groups are calculated, the channel group generation unit 130 may generate one or more channel groups using the calculated similarities.

FIGS. 5 to 8 are diagrams showing an example in which the content recommendation device generates channel groups according to an embodiment of the present invention. A description will be made with reference to FIGS. 5 to 8 by way of example.

The channel group generation unit 130 may compare the calculated similarities with a preset similarity threshold, and may merge channels having similarities exceeding the similarity threshold into one or more channel groups. Here, when the similarity has a value ranging from 0 to 1, the preset similarity threshold may be preset to an arbitrary value (e.g. 0.5) so that an appropriate number of channel groups for the number of channels may be generated.

Figure 5:
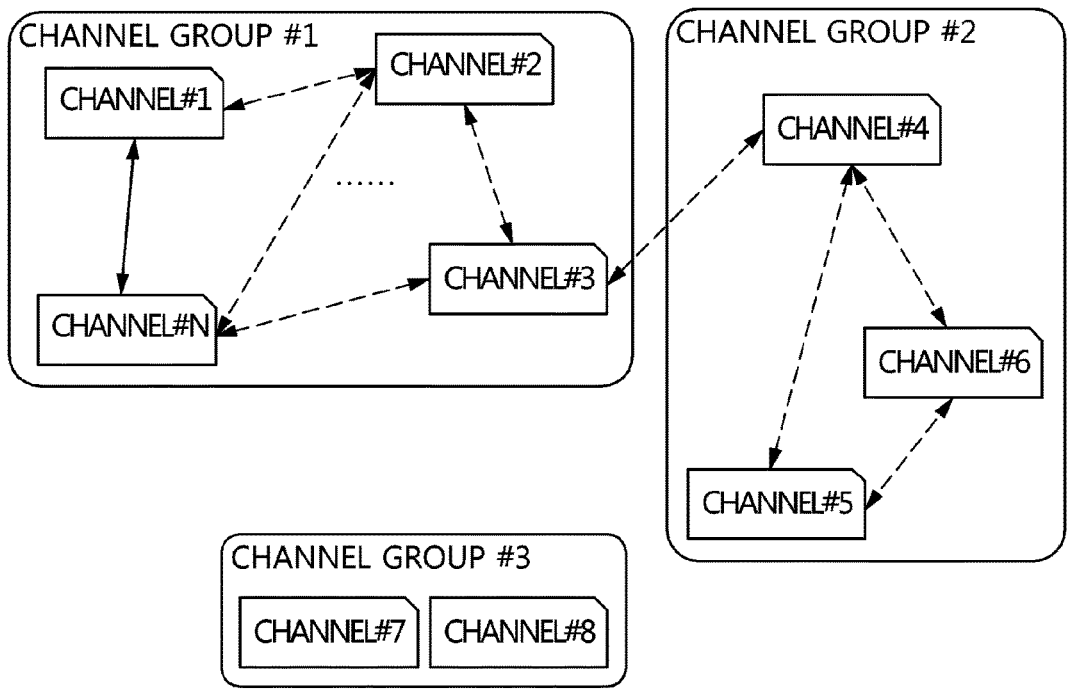
FIGS. 5 to 8 are diagrams showing an example in which the content recommendation device generates channel groups according to an embodiment of the present invention.
Figure 6:
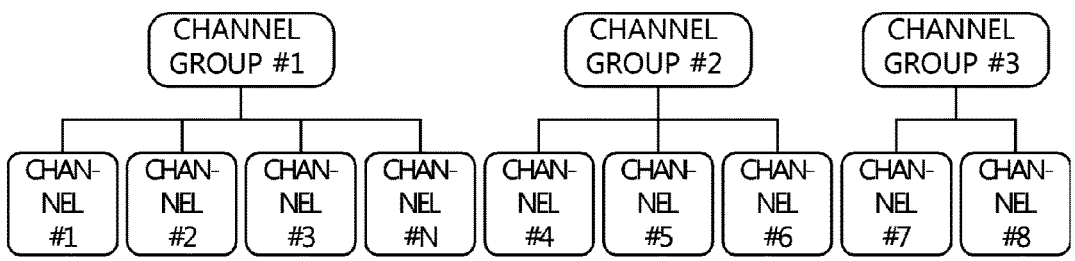

For example, assuming that the similarity between channel #1, channel #2, channel #3, and channel #N is greater than the similarity threshold (e.g. 0.5) and the similarity between channel #4, channel #5, and channel #6 is greater than the similarity threshold (e.g. 0.5), they may be merged into channel group #1 and channel group #2, respectively, as shown in FIGS. 5 and 6.

Here, individual channel groups may have an association therebetween. That is, as shown in the drawing, the similarity falls between channel #3 and channel #4, but does not exceed the preset similarity threshold, and thus channels #3 and 4 may be associated with each other.

Further, channels, the similarity between which do not exceed the similarity threshold, are merged into a single channel group (e.g. channel group #3), and this channel group #3 may not be associated with other channel groups #1 and #2. Further, for channels that are not similar to all other channels, for example, channels having a similarity of 0 to other channels, a single channel may form a single channel group.

Meanwhile, the preset similarity threshold may have range information composed of two or more values, for example, an upper limit (e.g. 0.7) and a lower limit (e.g. 0.3).

Figure 7:
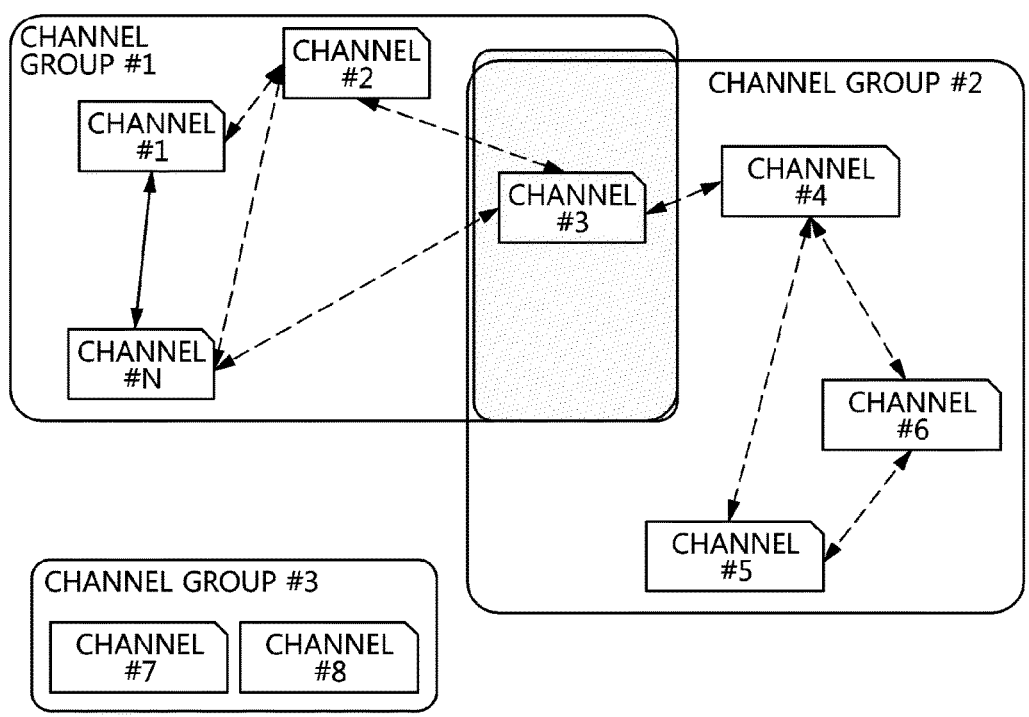

For example, assuming that both the similarity between channel #1, channel #2, and channel #N and the similarity between channel #4, channel #5, and channel #6 exceed the upper limit (e.g. 0.7), the channel group generation unit 130 may merge channel #1, channel #2, and channel #N into a single channel group #1, and merge channel #4, channel #5, and channel #6 into another channel group #2, as shown in FIG. 7.

Figure 8:
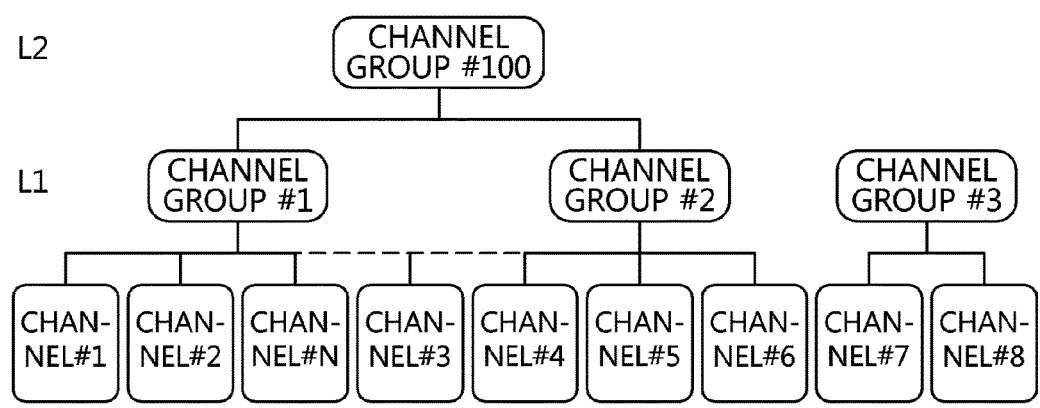

Further, assuming that the similarity between channel #3 and channel #2 is 0.4, the similarity between channel #3 and channel #N is 0.6, and the similarity between channel #3 and channel #4 is 0.5, channel #3 may belong to both channel group #1 and channel group #2, and an upper channel group #100 for connecting channel group #1 to channel group #2 may be generated, as shown in FIG. 8. In this case, a channel group composed of two or more levels (e.g. L1, L2) may be generated, and the number of generated channel groups may be greater than the number of channels N.

Similarly, channels (e g channels #7 and #8) having a similarity less than the lower limit (e.g. 0.3) are merged into a single channel group (e g channel group #3). If there is a channel that is completely dissimilar to other channels, it may independently form a single channel group.

The channel group generation unit 130 may implement and manage the generated one or more channel groups in the form of a hierarchical tree, as shown in FIGS. 6 to 8.

Meanwhile, the content belongingness calculation unit 180 may calculate the channel-based belongingness of content broadcasted on each channel using the collected broadcast information. For example, "movie" content broadcasted on a "movie channel" may have high belongingness to the corresponding channel "Drama" content broadcasted on a "drama channel" may have high belongingness to the corresponding channel. That is, when the belongingness has a value ranging from 0 to 1, the belongingness in the above case may be calculated as '1'. In contrast, "drama" content broadcasted on a "movie channel" may have belongingness (e.g. 0.7) lower than that of "movie".

In this way, pieces of content broadcasted on multiple channels may be extracted, and the belongingness values of each piece of content to channels may be calculated. In this case, specific content may have belongingness values for two or more channels.

The channel group update unit 190 may update the relationship between the generated channel groups using the content belongingness values calculated by the content belongingness calculation unit 180. Here, the channel group generation unit 190 is configured to, when the specific content belongs to two or more channels due to the calculated content belongingness and the two or more channels belong to different channel groups, generate an upper channel group for the different channel groups, as shown in FIG. 8, thus enabling the relationship between the channel groups to be defined.

For example, when content #1 is broadcasted both on channel #1 and channel #3, an associative relationship between channel group #1, to which channel #1 belongs, and channel group #2 to which channel #3 belongs, is generated, resulting in a relationship in which channel #2, belonging to channel group #1, is connected to channel #3. By means of this procedure, an associative relationship may appear even between channels on which no content is broadcasted in common, and content information may be recommended between the channels, based on the associative relationship.

Figure 9:
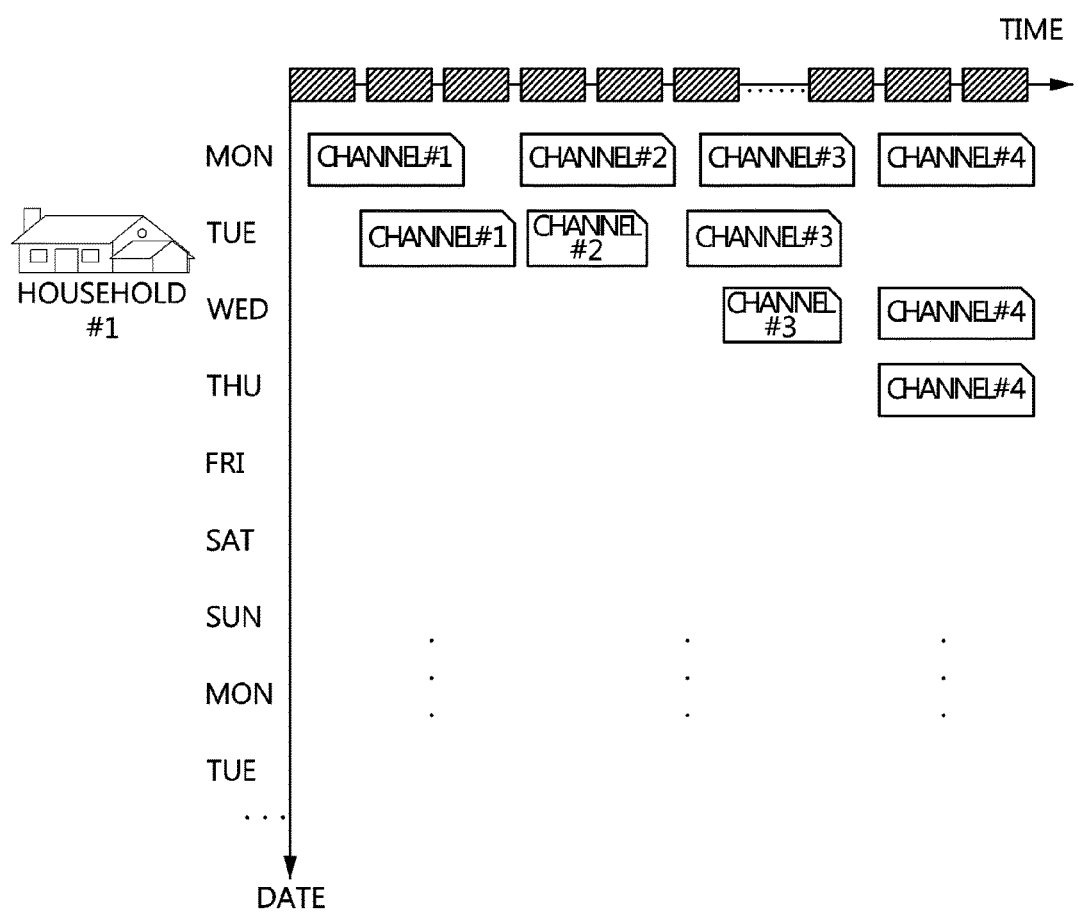
FIGS. 9 and 10 are diagrams showing viewing history information collected by the content recommendation device according to an embodiment of the present invention.
Figure 10:

FIGS. 9 and 10 are diagrams showing viewing history information collected by the content recommendation device according to an embodiment of the present invention.

The viewing history collection unit 140 collects pieces of viewing history information from respective user groups. For example, as shown in FIGS. 9 and 10, viewing history information 20, which is obtained for a preset period (e.g. a week, a month, a quarter, or a year), may be collected from a specific user group (e.g. household #1). Here, the collected viewing history information 20 may include information about viewing channels, viewing times, and pieces of content broadcasted on each viewing channel, for each user group.

Referring to the viewing history information 20 of FIGS. 9 and 10, household #1 exhibits a viewing pattern in which, in a temporal sequence, content #1 and content #2 are viewed on channel #1, content #3 is viewed on channel #2, and content #4 is viewed on channel #3 on Monday.

Figure 11:
FIGS. 11 and 12 are diagrams showing viewing history information for each channel group converted by the content recommendation device according to an embodiment of the present invention.
Figure 12:
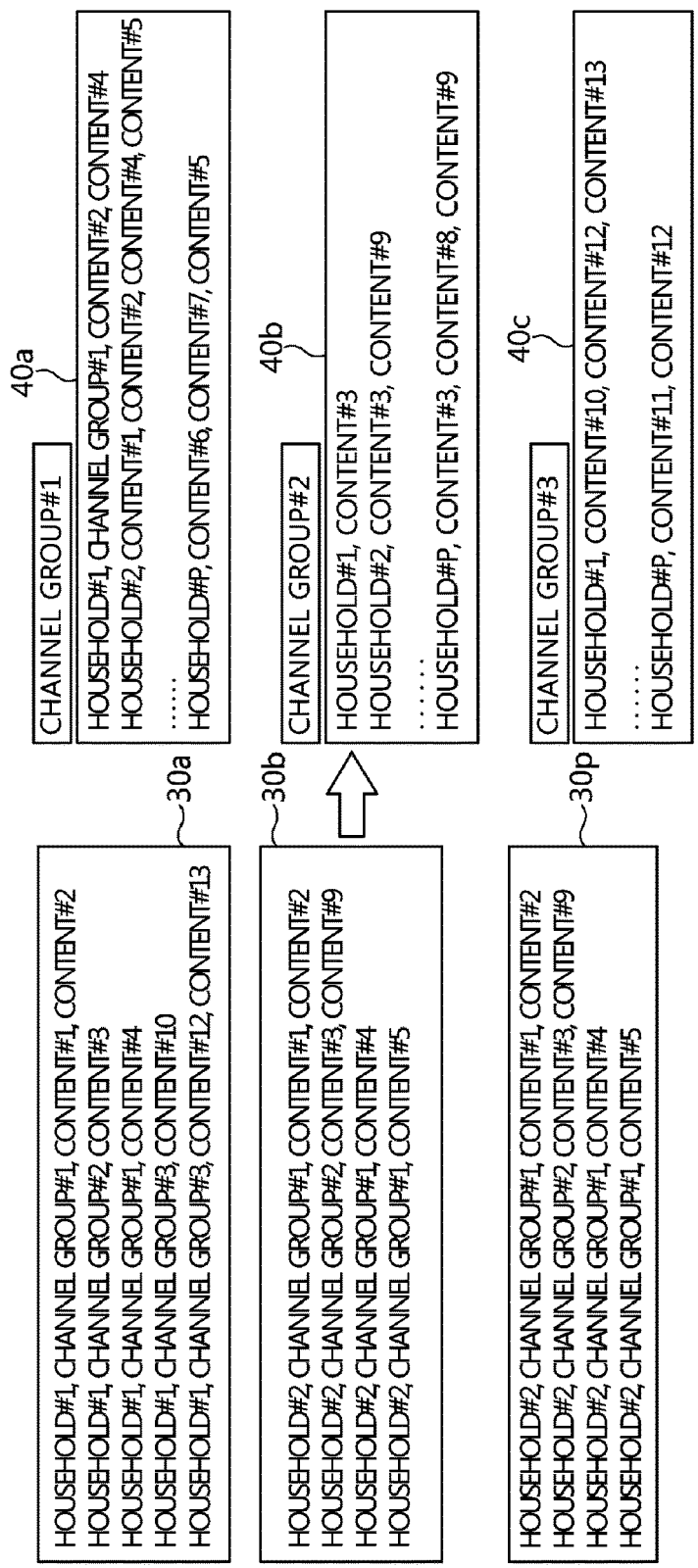

FIGS. 11 and 12 are diagrams showing viewing history information for each channel group converted by the content recommendation device according to an embodiment of the present invention.

The viewing history conversion unit 150 is configured to, when viewing history information 20 is collected from each user group, convert the collected viewing history information 20 for each user group into viewing history information for each channel group generated by the channel group generation unit 130. That is, as shown in FIG. 11, the viewing history conversion unit 150 may generate viewing history information 30, in which each channel is converted into a channel group to which the channel belongs, using the channel information of the viewing history information 20 collected from each user group.

For example, when channel #1 and channel #3 belong to the same channel group #1, and channel #2 and channel #4 respectively belong to separate channel groups #2 and #3, the viewing history of channel #1 and channel #3 may be converted into the viewing history of channel group #1, as shown in FIG. 11.

Here, a single piece of content may belong to various channel groups depending on the calculated content belongingness thereof, as described above. In this way, when content that belongs to multiple channel groups is viewed on a specific channel, the viewing history for multiple channel groups may be generated.

The recommendation information generation unit 160 is configured to, when viewing history information 30 for each channel group is generated, as shown in FIG. 11, calculate a content preference for each channel group, based on the viewing history information 30, and generate content recommendation information for each channel group for each user group based on the calculated content preference.

Here, the recommendation information generation unit 160 assumes that each user group is a single user, and may generate content recommendation information for each channel group for each user group, rather than for each member of each user group. If there are M channel groups, recommendation information for a maximum of M channel groups may be generated for each user group.

For example, referring to pieces of channel group-based viewing history information 30$a$, 30$b$, and 30$p$, which are generated for respective households #1, #2 to #P of FIG. 12, and pieces of viewing history information 40$a$, 40$b$, and 40$c$ for respective generated channel groups #1, #2, and #3, both household #1 and household #2 have viewed content #1, content #2, and content #4 in channel group #1. Here, when the type of content #1, content #2, and content #4 is an action movie, the preference for action movie content is set to a high value. Content recommendation information may be generated using action movies that have not yet been viewed by household #1 and household #2, among the available action movies. In addition, information about actors appearing in content #1, content #2, and content #4, directors, release dates, and synopses is additionally analyzed, so that a content preference for other action movies in which the actors of the content appeared and for other action movies produced by the directors of the content is set to a high value. Content recommendation information may be generated using the content preference.

Further, it is also possible to recommend content, viewed by another household that exhibits a similar viewing history in the same channel group, to a certain household as high preference content in such a way that household #1 did not view content #5, and content #5 viewed by household #2 that exhibits a similar viewing history is generated as content to be recommended to household #1.

In this way, in accordance with the present embodiment, the recommendation information generation unit 160 may generate content preferences in consideration of various criteria and generate content recommendation information depending on the preferences, but it is not limited to the above-described example.

When content recommendation information for each channel group is generated for each user group, the recommendation information provision unit 170 provides the content recommendation information to each user group. Here, the recommendation information provision unit 170 may receive, in real time, information about the channel on which each user group is currently viewing content, or the new channel when the channel is changed for viewing, and may provide content recommendation information based on the received channel information. That is, content recommendation information of the channel group to which a channel on which content is currently being viewed by a user group or a channel selected for viewing belongs is displayed in a predetermined area of the content that is currently being viewed to overlap the content, or recommendation information may be displayed when a user group requests the content recommendation information.

Further, the recommendation information provision unit 170 may analyze information about content currently being viewed by a user group and provide the recommendation information for content similar to the content being viewed. For example, as described above, each piece of content may belong to different channel groups depending on the belongingness thereof. That is, individual channel groups may have associations therebetween. Thus, when content currently being viewed on a specific channel has higher belongingness to another channel group, content recommendation information for the channel group may be provided. That is, when a specific user group is viewing a movie on an education channel, the movie may have higher belongingness to the channel group corresponding to a movie channel, and thus content recommendation information for the channel group to which the movie channel belongs may be provided.

Here, when the channel groups at several levels (L1 and L2) are generated due to the associative relationship between channels, as described above with reference to FIG. 8, the recommendation information provision unit 170 may provide content recommendation information for the channel groups at the first level (L1) with higher priority, and provide content recommendation information for the channel group at the second level (L2) with priority lower than that of L1.

Figure 13:
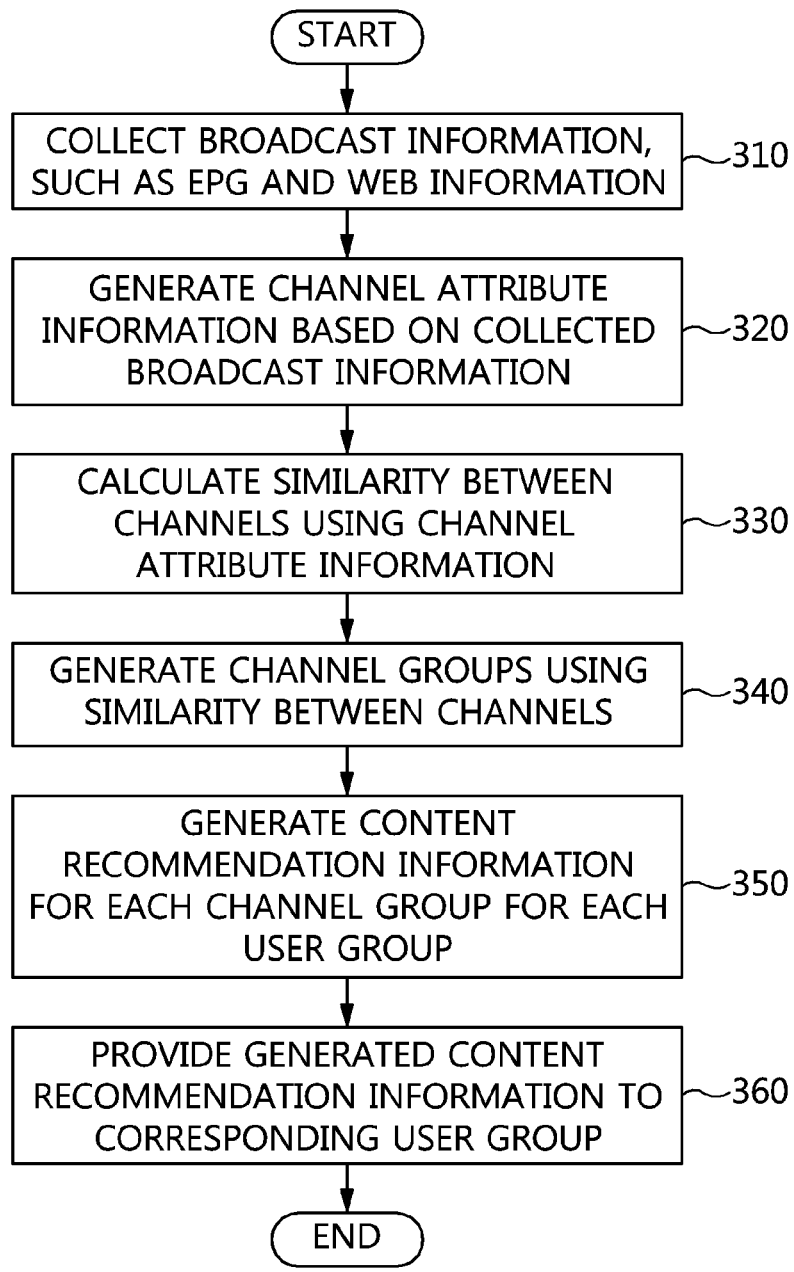
FIG. 13 is an operation flowchart showing a content recommendation method according to an embodiment of the present invention.

FIG. 13 is an operation flowchart showing a content recommendation method according to an embodiment of the present invention.

FIG. 13 may illustrate an embodiment of a content recommendation method performed by the content recommendation device 100 according to the embodiment of FIG. 2.

Referring to FIG. 13, in the content recommendation method according to the embodiment of the present invention, the content recommendation device 310 may collect broadcast information such as an EPG, web information, the meta-information of channels, and the meta-information of content at step 310. For example, the collected broadcast information may include broadcast content names, broadcast content descriptions, channel information such as genres, channel names, and channel descriptions, obtained from the EPG and the meta-information of channels, and content names, actors, directors, synopses, and producers, obtained from broadcast information disclosed on the web and the meta-information of content broadcasted on each channel.

Next, the attribute information of each channel may be generated based on the collected broadcast information at step 320. Here, the attributes may be classified into "movie channel", "drama channel", "kids' channel", "education channel", "business channel", "news channel", etc.

Then, when the attribute information of each channel is generated, the similarity between respective channels may be calculated using the attribute information at step 330. Here, the similarity may be calculated by additionally using information about overlap between pieces of content broadcasted on respective channels, for example, information about whether overlap exists between pieces of content, the number of pieces of overlapping content, etc., as well as by using the attribute information of each channel Therefore, even if the attributes of channels are different from each other, the calculated similarity may relatively increase depending on the extent of overlap between pieces of broadcasted content. Even if the attributes of channels are identical to each other, the similarity between channels having more content in common may be calculated as a higher value than the similarity between channels having less content in common.

Then, when the similarities between the individual channels are calculated, one or more channel groups may be generated using the calculated similarities between the channels at step 340. Here, the calculated similarities may be compared with a preset similarity threshold, so that channels, the similarities between which exceed the similarity threshold, may be merged into one or more channel groups. Here, the merged channel groups may be associated with each other. In contrast, channels, the similarities between which do not exceed the similarity threshold, may be merged into a single channel group. Such a channel group may not have an associative relationship with other channel groups.

Further, the similarity threshold may be preset to a range having an upper limit and a lower limit Channels, the similarity between which exceeds the upper limit, are merged into a single channel group, and channels, the similarity between which falls between the upper limit and the lower limit, belong to channel groups associated therewith. An upper channel group for the associated channel groups may be generated.

In this case, the belongingness of each piece of content to channels may be calculated, and channels belonging to different channel groups may have an associative relationship depending on the calculated belongingness to channels. Here, in a similar manner, an upper channel group for different channel groups that are associated with each other may be generated. For example, when any one piece of content is broadcasted on different channels, the content may belong to individual channels. Here, when the type of content is a movie, and one of the channels on which the content is broadcasted is "movie channel" and another channel is "drama channel", the belongingness of the content to "movie channel" may be calculated as a high value, and the belongingness of the content to "drama channel" may be calculated as a relatively low value.

Next, content recommendation information for each generated channel group may be generated for each user group at step 350. Here, viewing history information may be collected from each user group, and the collected viewing history information may be converted into viewing history information for each channel group. By utilizing the viewing history information for each channel group converted in this way, content preferences for respective channel groups may be calculated for each user group, and content recommendation information may be generated using the calculated preferences.

For example, content preferences may be calculated depending on the type of content for each channel group in such a way that, when the type of content is, for example, movies, the content preference may be calculated as a higher preference value for content corresponding to a type of movie similar to the type of content chiefly viewed in the corresponding channel group, based on movie types such as action movies, romantic movies, and Science Fiction (SF) movies. As described above, content preferences may be calculated in consideration of various criteria.

Next, the generated content recommendation information may be provided to the corresponding user group at step 360. Information about the channel on which each user group is currently viewing content, or information about the new channel when the channel being viewed is changed for viewing is received in real time, and the content recommendation information may be provided via the received channel information.

Further, information about content currently being viewed by the user group is analyzed, and recommendation information for a channel group on which content similar to the content being viewed is broadcasted may be provided. Furthermore, when channel groups at several levels (L1 and L2) are generated due to an associative relationship between the channels, content recommendation information for channel groups at the first level (L1) may be provided with higher priority, and content recommendation information for the channel group at the second level (L2) may be provided with priority lower than that of L1.

Figure 14:
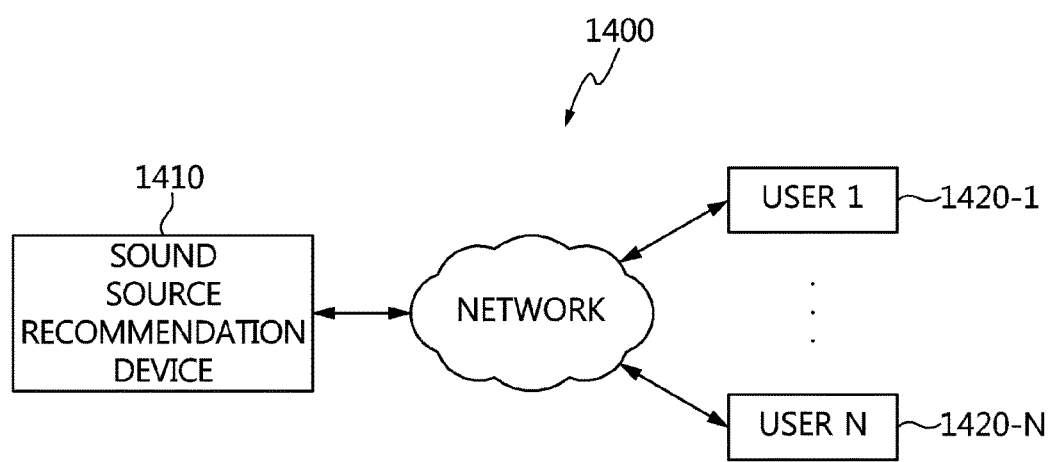
FIG. 14 is a block diagram showing a sound source recommendation system according to an embodiment of the present invention.

FIG. 14 is a block diagram showing a sound source recommendation system according to an embodiment of the present invention.

Referring to FIG. 14, a sound source recommendation system 1400 according to an embodiment of the present invention includes a sound source recommendation device 1410 and user terminals 1420-1 to 1420-N.

As shown in the drawing, the sound source recommendation device 1410 may be implemented as a hardware device physically spaced apart from the user terminals 1420-1 to 1420-N, and may be connected to the user terminals over a network.

The network, which provides a path for transferring data between the sound source recommendation device 1410 and the user terminals 1420-1 to 1420-N, is a concept including both conventionally used networks and networks that may be developed in the future. For example, the network may be a wired/wireless local area network (LAN) for providing communication between various types of information devices in a limited area, a mobile communication network for providing communication between moving objects and between a moving object and a system external to the moving object, or a satellite communication network for providing communication between earth stations using a satellite, or any one of wired/wireless communication networks or a combination of two or more thereof. Meanwhile, transfer mode standards of the network are not limited to an existing transfer mode standard, but may include all transfer mode standards that will be developed in the future.

The sound source recommendation device 1410 may collect the sound source listening histories of respective users from the user terminals 1420-1 to 1420-N. Here, when each user listens to the sound sources stored in the corresponding terminal 1420-1 to 1420-N, or accesses a sound source provision website and listens to a sound source, an application for collecting the sound source listening histories and transmitting the collected histories to the sound source recommendation device may be installed in advance in each of the user terminals 1420-1 to 1420-N.

Alternatively, although not shown in the drawing, the sound source recommendation device 1410 may be affiliated with a system for operating a sound source provision site, and may collect the sound source listening history information of users from the system. Here, the sound source recommendation device 1410 may also be implemented in the system for operating the sound source provision site, and may directly collect the sound source listening histories of users who listen to sound sources in the sound source provision site.

Meanwhile, the sound source recommendation device may collect the sound source listening history of each user at intervals of a preset period (e.g. daily, weekly, monthly, quarterly, or the like). In this way, the sound source listening history of the user may be collected at intervals of a preset period, so that the user's intent is determined, thus following the change in the preference of the user.

Further, the sound source recommendation device 1410 is configured to, when the sound source listening history information of the user is collected, determine the user's intent using the sound source listening history information.

For example, the user's intent may be determined in relation to which words are contained in the user's favorite music, which themes the user's favorite music has, which chord changes the user's favorite music has, which melody changes the user's favorite music has, or what kind of artists or genres the user prefers.

When the user's intent has been determined in this way, the sound source recommendation device 1410 may determine sound sources to be recommended to the user from among all recommendable sound sources, based on the intent information. Further, the recommendation sound sources may be transmitted to the user terminal 1420-1 to 1420-N and may be displayed on the display thereof, or may be provided to the user by outputting the recommendation sound sources via a sound source provision site when the user accesses the sound source provision site using the terminal 1420-1 to 1420-N.

Here, the sound source recommendation device 1410 may determine the exposure sequence of sound sources to be recommended depending on each user's intent, align sound sources to be recommended depending on the determined exposure sequence, and provide the sound sources to the user.

Further, in accordance with the present embodiment, the sound source recommendation device 1410 may provide the user with the reason for determining sound sources to be recommended, as the reason for recommending the sound sources.

Each of the user terminals 1420-1 to 1420-N may access a communication network over a network and connect to the sound source recommendation device 1410, and may then transmit information about a sound source listening history to the sound source recommendation device 1410 and receive recommended sound sources from the sound source recommendation device 1410.

Here, each of the terminal devices 1420-1 to 1420-N may be a mobile terminal such as a smart phone or a smart pad, with which sound sources may be listened to. However, the terminal devices are not limited thereto, and may include various terminals such as all information and communication devices, multimedia terminals, wired terminals, fixed terminals, and IP terminals. Further, the terminal devices 120 may include mobile terminals having various mobile communication specifications, such as a mobile phone, a Portable Multimedia Player (PMP), a Mobile Internet Device (MID), a desktop PC, a tablet PC, a notebook computer, a Netbook, a Personal Digital Assistant (PDA), a smart TV, and an information and communication device.

When each of the user terminals 1420-1 to 1420-N receives recommendation sound sources from the sound source recommendation device 1410, the received recommendation sound sources may be output via the display thereof and provided to the corresponding user. For example, when a sound source listening application installed in the user terminal 1420-1 to 1420-N is executed in order for the user to listen to sound sources, the recommendation sound sources provided to the sound source listening application may be exposed.

However, the method for providing recommendation sound sources is not particularly limited, and it is possible for each user to receive recommendation sound sources whenever the user accesses the sound source provision site using the corresponding terminal 1420-1 to 1420-N, as described above, or whenever the user requests recommendation sound sources from the sound source provision site. In addition, such a method may be extended using various other methods.

Hereinafter, the sound source recommendation device 1410 according to an embodiment will be described in detail with reference to FIGS. 15 to 18.

Figure 15:
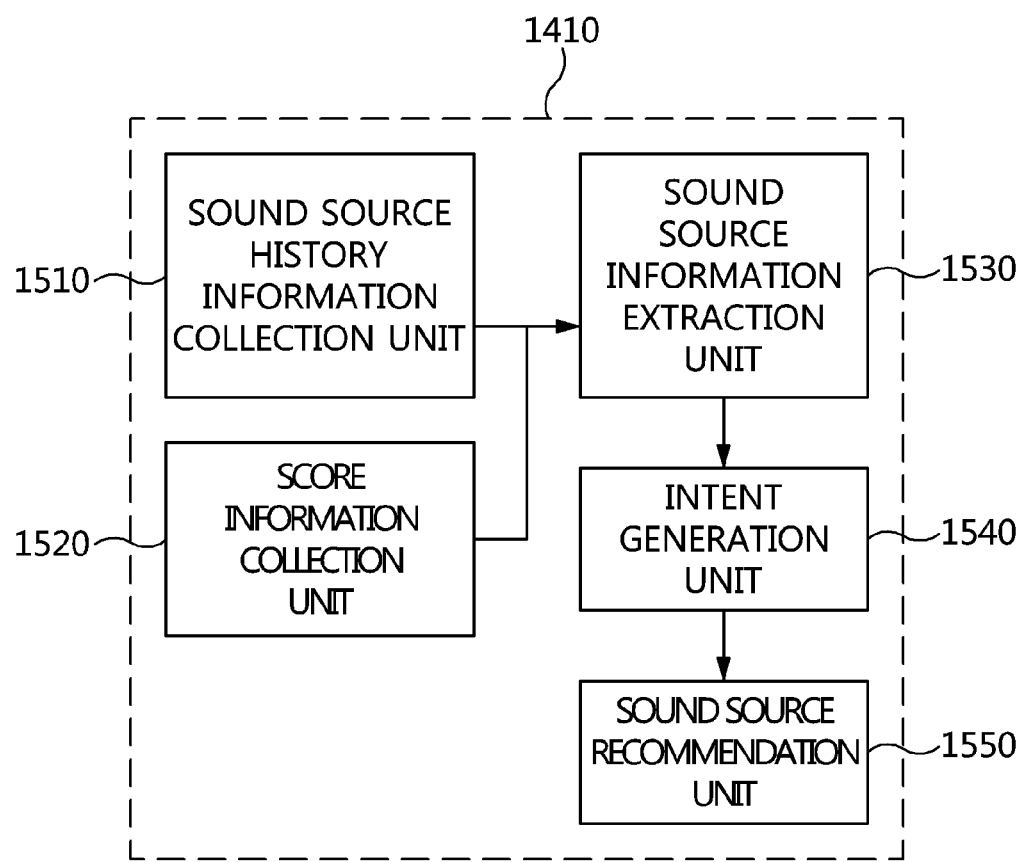
FIG. 15 is a block diagram showing an example of the sound source recommendation device shown in FIG. 14.
Figure 16:
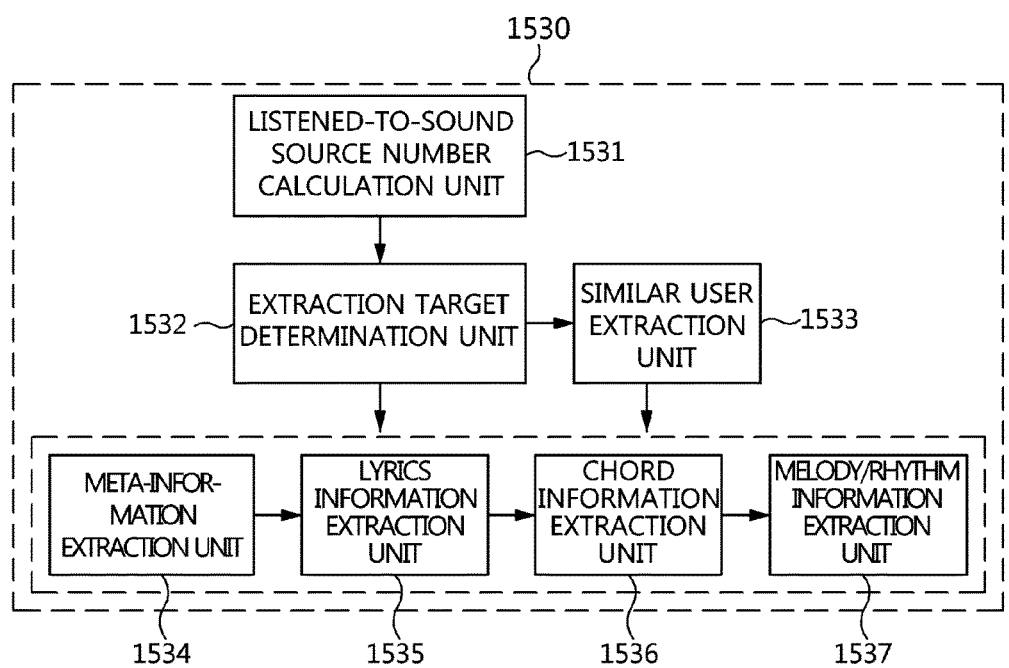
FIG. 16 is a block diagram showing an example of the sound source information extraction unit shown in FIG. 15.
Figure 17:
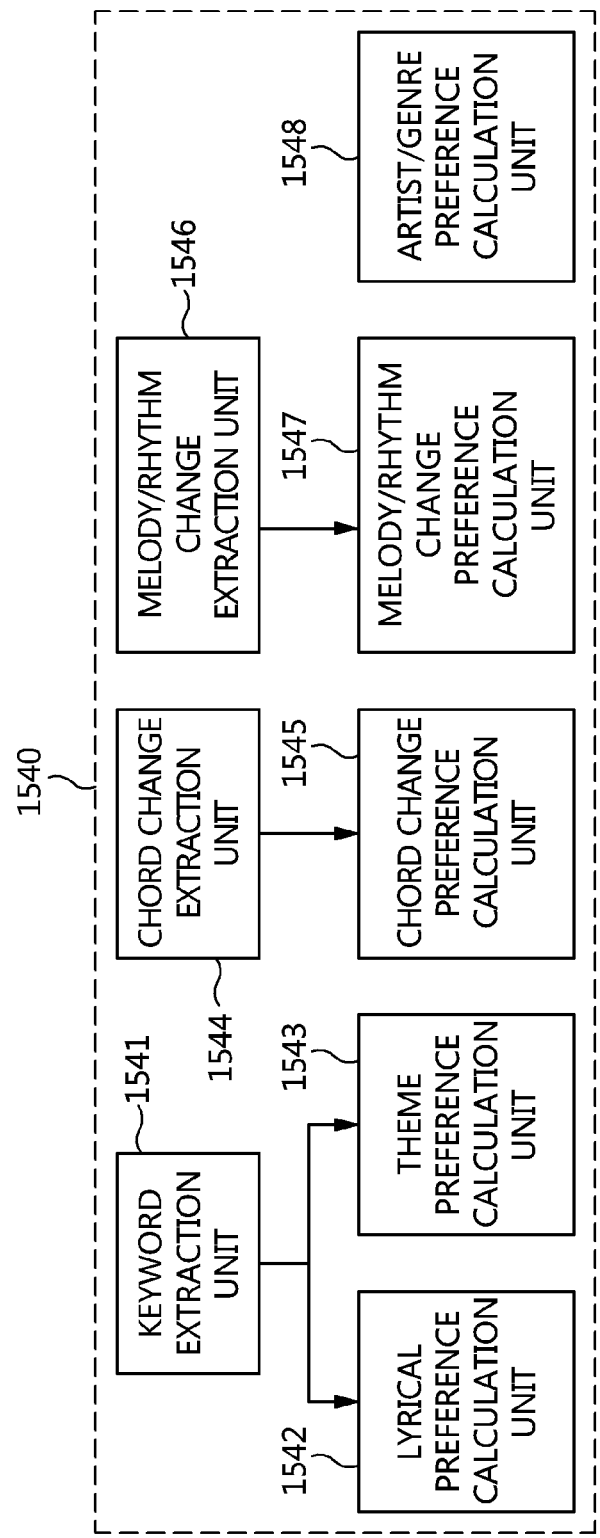
FIG. 17 is a block diagram showing an example of the intent generation unit shown in FIG. 15.
Figure 18:
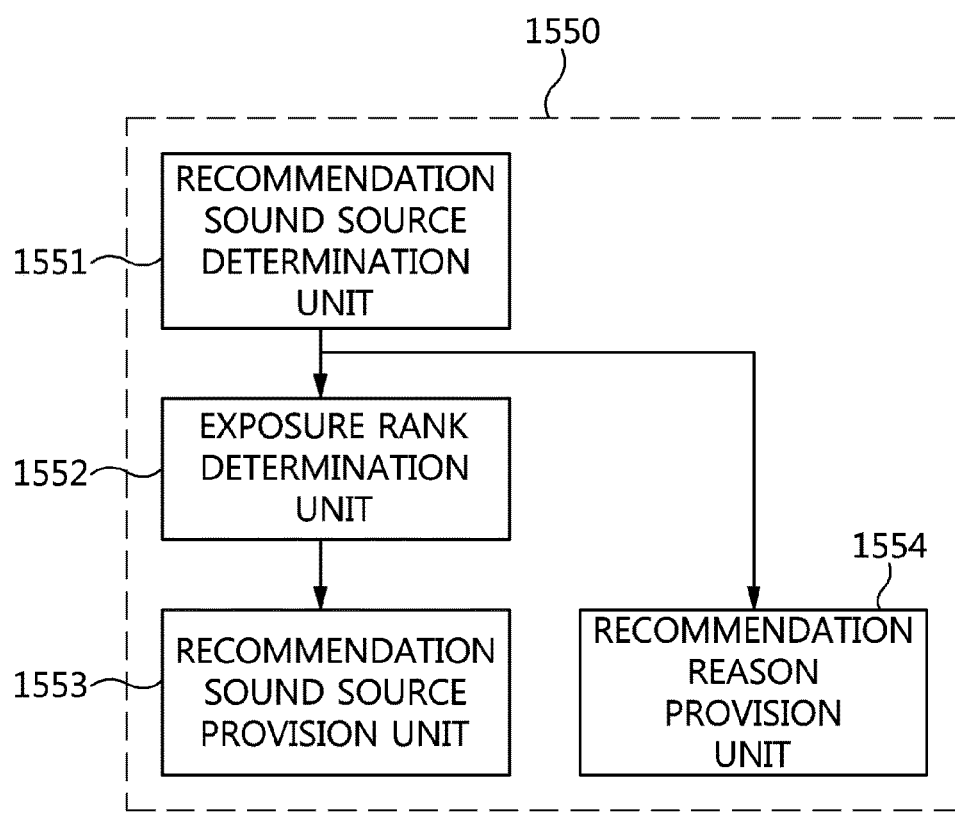
FIG. 18 is a block diagram showing an example of the sound source recommendation unit shown in FIG. 15.

FIG. 15 is a block diagram showing an example of the sound source recommendation device shown in FIG. 14. FIG. 16 is a block diagram showing an example of the sound source information extraction unit shown in FIG. 15. FIG. 17 is a block diagram showing an example of the intent generation unit shown in FIG. 15. FIG. 18 is a block diagram showing an example of the sound source recommendation unit shown in FIG. 15.

Referring to FIG. 15, the sound source recommendation device 1410 may include a sound source history information collection unit 1510, a score information collection unit 1520, a sound source information extraction unit 1530, an intent generation unit 1540, and a sound source recommendation unit 1550.

Here, in the sound source recommendation device 1410, one or more of the components 1510, 1520, 1530, 1540, and 1550 are implemented using a distributed processing system, thus improving the execution speed thereof. That is, the individual components of the sound source recommendation device 1410 may be distributed to one or more computing devices and may then perform respective functions in the computing devices. Alternatively, the components of the intent generation unit 1540 that require high computing performance due to a high computational load may be implemented in two or more computing devices, so that the function of generating users' intents may be distributed and processed in respective computing devices.

As illustrated in the following Table 1, the sound source history information collection unit 1510 may collect the sound source listening history information of each user during a predetermined period (e.g. one week). In this case, the sound source listening history information may include information about the titles of sound sources listened to by the corresponding user during a predetermined period, the number of times each sound source was listened to, the time slot in which each sound source is mainly listened to, etc.

TABLE 1

| Title of music listened to | Number of listening times | Main listening time slot |
|---|---|---|
| MUSIC_1 | 3 | 08:00~09:00 |
| MUSIC_2 | 2 | 08:00~09:00 |
| MUSIC_3 | 5 | 12:00~13:00 |
| MUSIC_4 | 4 | 12:00~13:00 |
| MUSIC_5 | 7 | 19:00~20:00 |
| MUSIC_6 | 1 | 09:00~10:00 |
| MUSIC_7 | 2 | 08:00~09:00 |
| MUSIC_8 | 8 | 19:00~20:00 |
| MUSIC_9 | 6 | 23:00~24:00 |
| MUSIC_10 | 5 | 23:00~24:00 |

As described above, the sound source history information collection unit 1510 may receive sound source listening history information from the accessing user's terminal or collect the sound source listening history information of the user from the system of a sound source provision site accessed by the user.

The score information collection unit 1520 may collect the score information of sound sources from various sources such as user terminals and sound source provision sites on the Internet.

The sound source information extraction unit 1530 may extract sound source information about sound sources listened to by the user using the collected sound source listening history information. Here, the sound source information may include information about the lyrics of each sound source, the rhythm/melody information of each bar, having a predetermined length, of each sound source, and the chord information and meta-information of each sound source. Further, the meta-information may include the names of artists, the titles of albums, and the titles of music for sound sources.

The sound source information extraction unit 1530 is configured to, when score information is collected, extract sound source information about the sound source listened to by the user using the score information. For example, when lyrics information is included in score information, the lyrics information may be extracted as the lyrics information of the sound source. Further, since the sound source is produced based on the score, melody/rhythm information may be extracted by checking the lengths and the scales of notes used in each bar based on the notes indicated in the score. Furthermore, the progression of sound sources may be converted into the progression of chords (e.g. C, G, Dm, G7, etc.), standardized in the music industry field, and then chord information may be extracted.

Meanwhile, when collected score information is not present or is insufficient, the sound source information extraction unit 1530 may extract sound information using various well-known sound source recognition technology.

An embodiment of the sound source information extraction unit 1530 will be described in greater detail with reference to FIG. 16. The sound source information extraction unit 1530 may include a listened-to-sound source number calculation unit 1531, an extraction target determination unit 1532, a similar user extraction unit 1533, a meta-information extraction unit 1534, a lyrics information extraction unit 1535, a chord information extraction unit 1536, and a melody/rhythm information extraction unit 1537.

The listened-to-sound source number calculation unit 1531 may calculate the number of sound sources listened to by the user using the sound source listening history information of the user.

For example, referring to Table 1, the listened-to-sound source number calculation unit 1531 may calculate the value 10, indicating the number of sound sources listened to by the user in one week, as the number of sound sources listened to. Alternatively, the total number of sound sources and the number of times each sound source was listened to may be added to each other, and then the resultant value may be calculated as the number of sound sources listened to. Alternatively, the number of sound sources listened to may be determined by applying weights, calculated based on the number of times each sound source was listened to, to the total number of sound sources. The number of sound sources listened to may also be calculated in consideration of various other criteria.

The extraction target determination unit 1532 may determine sound source information extraction targets based on the number of listened sound sources calculated in this way. For example, it is possible to compare the calculated number of listened sound sources with a preset reference value, so that, if the number of listened sound sources is less than the preset reference value, it is determined that the listening history collected for that user is not sufficient, and that sound source information is to be extracted from the sound source listening history information of other users.

The similar user extraction unit 1533 is configured to, when it is determined that the sound source information is to be extracted using the sound source listening history information of other users, extract one or more users similar to the user.

Here, the similar user extraction unit 1533 calculates the extent of overlap with sound sources listened to by other users, based on the sound source listening history information collected from the corresponding user, and extract as similar users a preset number of users from users who have listened to a high number of sound sources in common based on the calculated extent of overlap of sound sources. In this case, the preset number may be determined based on the amount of sound source listening history information collected for other users so that the performance of the entire system is not reduced.

As a result of the comparison by the extraction target determination unit 1532, when the number of listened sound sources is not less than the preset reference value, it may be determined that the sound source listening history collected for the user is sufficient, and sound source information is to be extracted from the sound source listening history information of the user.

In this way, when the extraction targets are determined by the extraction target determination unit 1532, the meta-information extraction unit 1534, the lyrics information extraction unit 1535, the chord information extraction unit 1536 and the melody/rhythm information extraction unit 1537 may respectively extract meta-information, lyrics information, chord information, and melody/rhythm information from each of the sound sources listened to by the user or similar users by utilizing the sound source listening history information of the user or similar users, depending on the results of the determination.

Hereinafter, for the convenience of description, an example in which sound source information is extracted using the sound source listening history information of the user will be described.

Referring back to FIG. 15, when sound source information is extracted by the sound source information extraction unit 1530, the intent generation unit 1540 may generate intent information of the user using the sound source information. Here, the intent information may include one or more of a lyrical preference, a theme preference, a chord change preference, a melody/rhythm change preference, and an artist/genre preference.

To describe in greater detail with reference to FIG. 17, the intent generation unit 1540 may include a keyword extraction unit 1541, a lyrical preference calculation unit 1542, a theme preference calculation unit 1543, a chord change extraction unit 1544, a chord change preference calculation unit 1545, a melody/rhythm change extraction unit 1546, a melody/rhythm change preference calculation unit 1547, and an artist/genre preference calculation unit 1548.

The keyword extraction unit 1541 extracts principal keywords from the entire lyrics using the lyrics information of sound source information. Here, the keyword extraction unit 1541 may extract meaningful words as principal keywords by performing morphological analysis on individual words constituting the lyrics.

In this case, the keyword extraction unit 1541 may extract, as keywords, words other than words stored in a stopword database (DB) (not shown) from all words extracted via morphological analysis. The stopword DB (not shown) may store in advance a list of words classified as words that are frequently used in most sound sources and do not have important meanings.

The lyrical preference calculation unit 1542 is configured to, when principal keywords have been extracted, obtain a first frequency, at which each keyword appears in the entire lyrics of each sound source listened to by the user, and calculate a lyrical preference indicating which words are contained in lyrics the user prefers, using the obtained first frequency.

Further, the lyrical preference calculation unit 1542 obtains a second frequency, at which each keyword repeatedly appears in the highlight or refrain of a sound source listened to by the user, and calculate the lyrical preference.

Meanwhile, the lyrical preference calculation unit 1542 may calculate the lyrical preference by taking into consideration either or both of the first frequency and the second frequency. Here, based on the second frequency, weights to be assigned to respective keywords may be determined, and the determined weights may be assigned to the first frequency or the second frequency, whereby the lyrical preference may be calculated.

The following Table 2 illustrates the first frequency and the second frequency, calculated for the extracted principal keywords, and weights determined by the second frequency.

TABLE 2

| Keyword | First frequency | Second frequency | Weight |
|---------|----------------|------------------|--------|
| Love    | 10             | 3                | 0.3    |
| Parting | 5              | 2                | 0.2    |
| Travel  | 30             | 1                | 0.1    |
| Dream   | 25             | 4                | 0.4    |

Referring to Table 2, as an example, when the lyrical preference is calculated using only the first frequency, the user's preference for lyrics containing the keyword "travel" may be calculated as the highest value. As another example, when both the first frequency and the second frequency are used, for example, when a value obtained by adding the first frequency to the second frequency is used, the user's preference for lyrics containing the keyword "travel" may also be calculated as the highest value. As a further example, when weights are applied to the first frequency and the lyrical preference is calculated, the lyrical preference values for the keywords 'love', 'parting', 'travel', and 'dream' are 3(10 0.3), 1(5 0.2), 3(30 0.1) and 10 (25 0.4), respectively, and thus the user's preference for lyrics containing the keyword "dream" may be calculated as the highest value.

The theme preference calculation unit 1543 may obtain the frequencies of appearance of each keyword extracted for respective themes, based on theme-based word association information that has been constructed in advance for all recommendable sound sources, and may calculate the theme preference based on the obtained appearance frequencies for respective themes.

The theme-based word association information may be constructed in advance for all contained sound sources. That is, for all sound sources, themes such as 'music for listening in autumn', 'music used in movies', and 'music for healing at parting' are designated, and words that appear chiefly in sound sources matching each theme are extracted, and thus associative relationships between themes and words may be constructed in advance.

The chord change extraction unit 1544 may extract chord change information based on the extracted chord information. For example, when the progression of chords used in any one sound source is given as C-G-Dm-G7-C-Dm-F, chord change information having a length of 2 to 7 may be extracted, as shown in the following Table 3.

TABLE 3

| Length | Chord change information |
| --- | --- |
| 2 | C-G, G-Dm, Dm-G7, G7-C, C-Dm, Dm-F |
| 3 | C-G-Dm, G-Dm-G7, Dm-G7-C, G7-C-Dm, C-Dm-F |
| 4 | C-G-Dm-G7, G-Dm-G7-C, Dm-G7-C-Dm, G7-C-Dm-F |
| 5 | C-G-Dm-G7-C, G-Dm-G7-C-Dm, Dm-G7-C-Dm-F |
| 6 | C-G-Dm-G7-C-Dm, G-Dm-G7-C-Dm-F |
| 7 | C-G-Dm-G7-C-Dm-F |

The chord change preference calculation unit 1545 may obtain the frequency at which each extracted chord change appears in all sound sources listened to by the user, and may calculate a chord change preference indicating which chord change the user prefers, using the obtained frequency.

Here, the chord change preference calculation unit 1545 may calculate the chord change preference by assigning a higher weight to the obtained frequency as the length of the chord change, that is, the number of chords contained in the extracted chord change is longer. Generally, it may be considered that, as the length of a chord change is longer and the frequency at which a chord change appears in sound sources is higher, the user's preference is higher, and thus the chord change length information may be reflected in the calculation of the chord change preference.

The melody/rhythm change extraction unit 1546 may extract melody/rhythm change information of each sound source listened to by the user using extracted melody/rhythm information. For example, when any one sound source is composed of quarter notes, and a scale is composed of only "do, re, mi, fa, sol", melody/rhythm change information having a length of 2 to 5 may be extracted, as shown in the following Table 4.

TABLE 4

| Length | Melody/rhythm change information |
| --- | --- |
| 2 | do re, re mi, mi fa, fa sol |
| 3 | do re mi, re mi fa, mi fa sol |
| 4 | do re mi fa, re mi fa sol |
| 5 | do re mi fa sol |

The melody/rhythm change preference calculation unit 1547 may obtain the frequency at which each of extracted melody/rhythm changes appears in all sound sources listened to by the user, and may calculate a melody/rhythm change preference indicating which melody/rhythm change the user prefers, using the obtained frequency.

Here, the melody/rhythm change preference calculation unit 1547 may calculate the melody/rhythm change preference by assigning a higher weight to the obtained frequency as the melody/rhythm change is longer. Generally, it may be considered that, as the melody/rhythm change is longer and the frequency at which the melody/rhythm change appears in sound sources is higher, the user's preference is higher, and thus the information about the length of the melody/rhythm change may be reflected in the calculation of the melody/rhythm change preference.

The artist/genre preference calculation unit 1548 may calculate a preference for an artist or a genre preferred by the user using the user's sound source listening history information and the extracted meta-information of sound sources. When, among sound sources listened to by the user, the number of pieces of music related to a specific artist or genre is greater than that of other artists or genres, the preference for the specific artist or genre may be calculated as a higher value. Here, when the numbers of sound sources listened to by the user for two or more artists or genres are identical, the preference for an artist or a genre to which the user listened a greater number of times may be calculated as a higher value in consideration of the number of times pieces of music corresponding to each artist or each genre are listened to.

Referring back to FIG. 15, the sound source recommendation unit 1550 may determine one or more recommendation sound sources to be recommended to the user from among all sound sources, based on the user's intent information or the similarity between pieces of intent information between multiple users, and may provide the determined sound sources to the user.

Described in detail with reference to FIG. 18, the sound source recommendation unit 1550 may include a recommendation sound source determination unit 1551, an exposure ranking determination unit 1552, a recommendation sound source provision unit 1553, and a recommendation reason provision unit 1554.

In accordance with an example of the recommendation sound source determination unit 1551, recommendation sound sources may be determined in consideration of various criteria, based on the user's intent information.

For example, it is possible to select "music containing the words 'dream' and 'travel'" as recommendation sound sources from among all sound sources, using the lyrical preference generated for the user, or select "music used in movies" as recommendation sound sources, using the theme preference. Alternatively, it is also possible to select "music containing a chord change of C-G-Dm-G7" as recommendation sound sources using the chord change preference, or select "music containing a melody/rhythm change of 'do re mi fa'" as recommendation sound sources using the melody/rhythm change preference. Similarly, it is also possible to select "music composed by Hong Gil-dong" as recommendation sound sources using the artist/genre preference.

In accordance with another example, the recommendation sound source determination unit 1551 may determine recommendation sound sources using a typical collaborative filtering algorithm by extracting similar users based on the intent information of the user and other uses.

For example, it is possible to select, as recommendation sound sources, "music preferred by users who like music containing the words 'dream' and 'travel'" based on the lyrical preferences of users, "music preferred by users who like the theme of parting" based on the theme preferences of users, "music preferred by users who like a chord progression similar to C-G-Dm-G7" based on the chord change preferences of users, and "music preferred by users who like a melody change similar to 'do re mi fa'" based on the melody/rhythm change preferences of users.

In accordance with a further example, the recommendation sound source determination unit 1551 may receive the user's keywords, acquire sound sources matching the keywords from all sound sources, based on the received keywords, and select the acquired sound sources as recommendation sound sources.

The exposure ranking determination unit 1552 may determine the exposure ranking of the determined recommendation sound sources using the user's intent information. For example, when a large number of recommendation sound sources are determined depending on keywords input by the user, the exposure ranking of the recommendation sound sources may be determined based on the user's intent information, for example, a lyrical preference, a theme preference, a chord change preference, a melody/rhythm preference, or the like. Here, the exposure ranking may be determined by combining one or more, or two or more, of the pieces of intent information of the user.

When recommendation sound sources to be recommended to the user are determined, the recommendation sound source provision unit 1553 may provide the recommendation sound sources to the user. Here, when the exposure ranking of individual recommendation sound sources is determined by the exposure ranking determination unit 1552, the recommendation sound sources may be aligned depending on the results of the determination, and the aligned recommendation sound sources may be provided to the user.

When the recommendation sound sources are determined, the recommendation reason provision unit 1554 may generate the reason for the recommendation based on the reason for determining the recommendation sound sources and provide the reason for the recommendation to the user.

For example, when recommendation sound sources are determined based on the user's intent, the reason for recommendation, such as "music containing the words 'dream' and 'travel'", "music for users who like the theme of travel" "music having a similar chord progression", or "music having a melody change similar to that of the user's favorite music A" may be generated and provided.

Alternatively, when recommendation sound sources are determined based on the similarity between users' intents, the reason for a recommendation such as "music for users who like music containing the words 'dream' and 'travel'", "music preferred by users who like the theme of travel", "music preferred by users who like a similar chord progression", or "music preferred by users who like a similar melody change" may be generated and provided.

In this way, the reasons for recommendation may be diversified and provided, so that a specific user may more specifically understand his or her preferences and the reason therefor, thus further improving the usefulness of recommendation sound source provision services.

Figure 19:
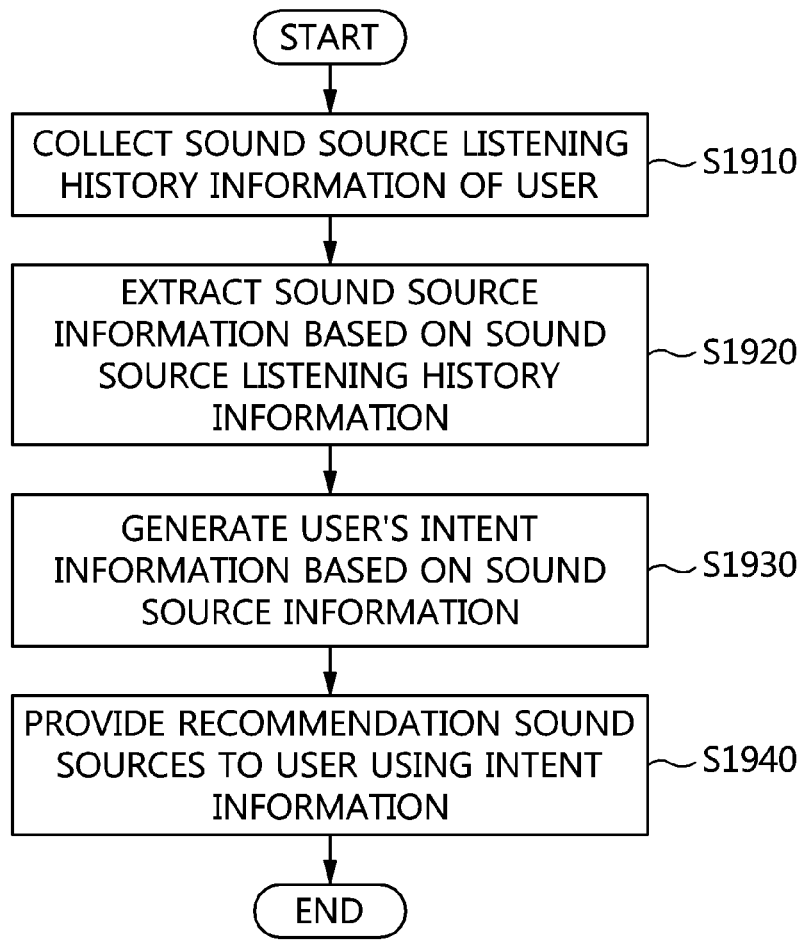
FIG. 19 is an operation flowchart showing a sound source recommendation method according to an embodiment of the present invention.
Figure 20:
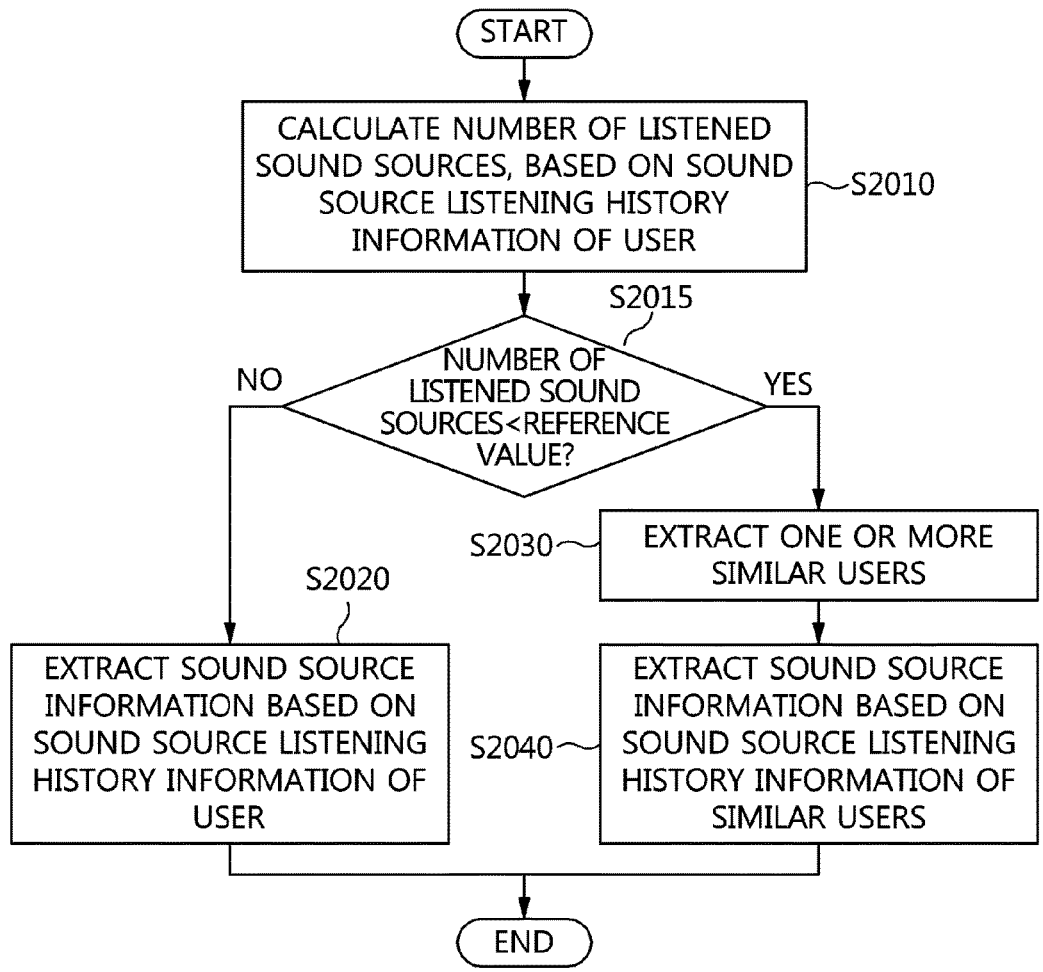
FIG. 20 is an operation flowchart showing an example of the sound source information extraction step shown in FIG. 19.
Figure 21:
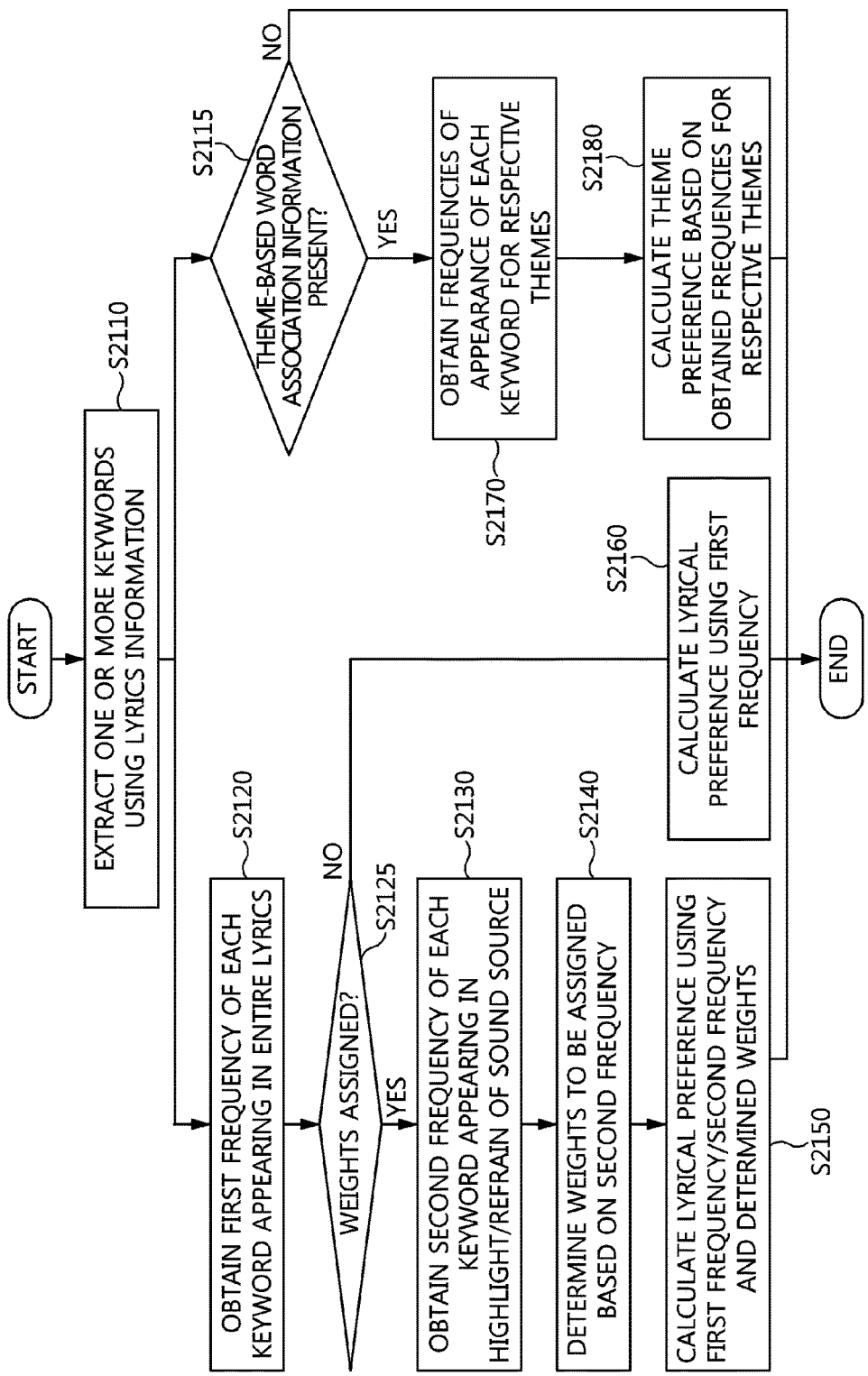
FIG. 21 is an operation flowchart showing an example of the intent information generation step shown in FIG. 19.
Figure 22:
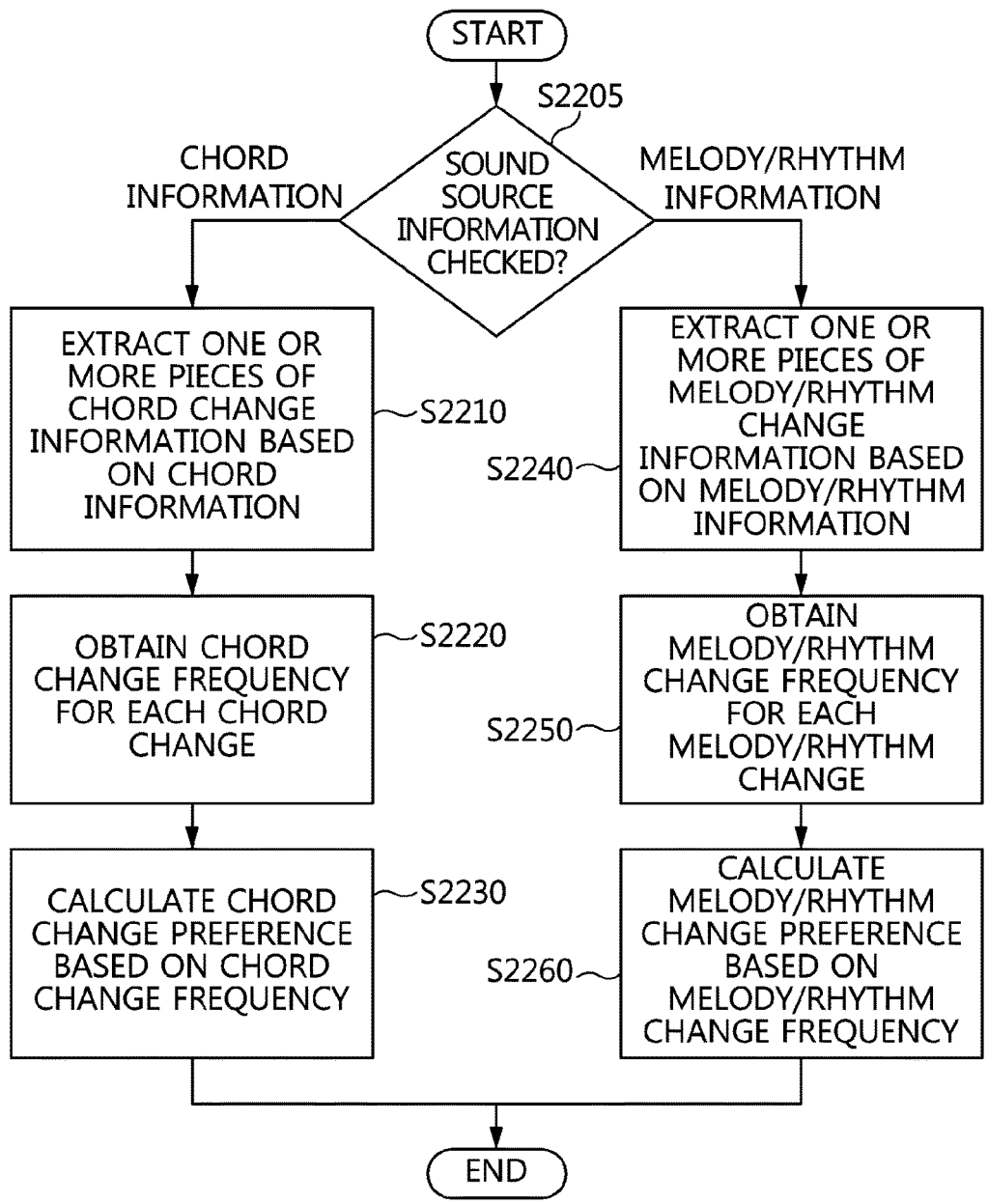
FIG. 22 is an operation flowchart showing another example of the intent information generation step shown in FIG. 19.
Figure 23:
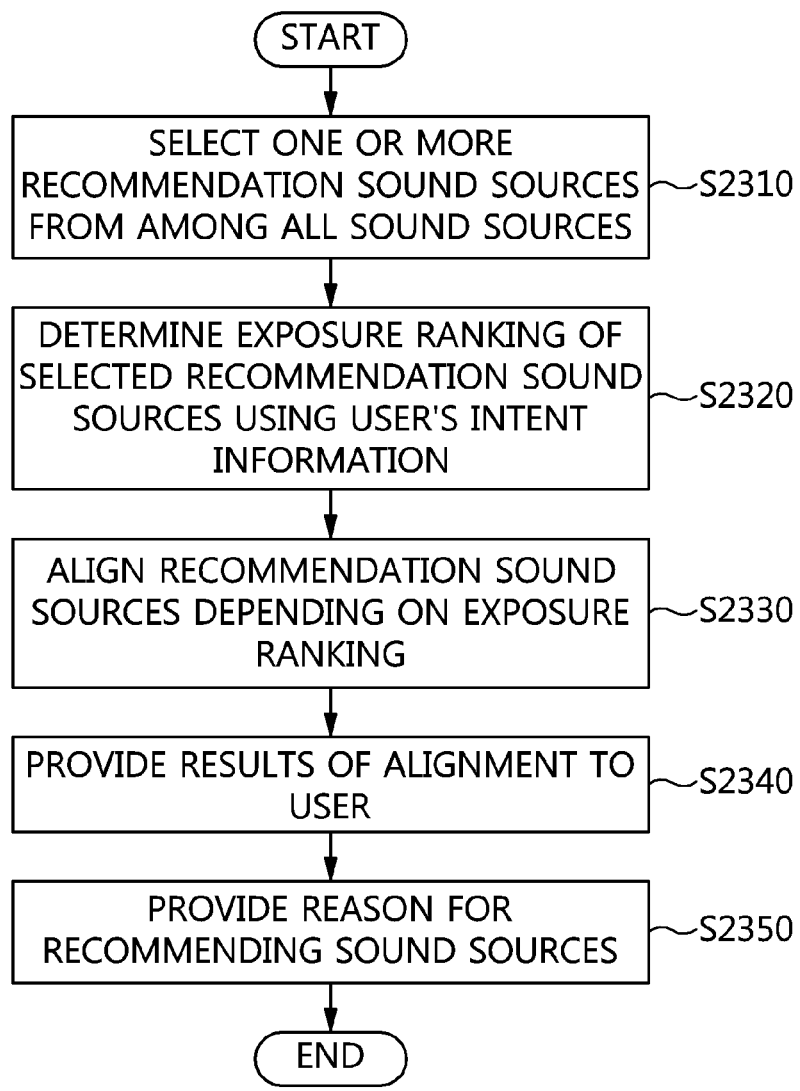
FIG. 23 is an operation flowchart showing an example of the recommended sound source provision step shown in FIG. 19.

FIG. 19 is an operation flowchart showing a sound source recommendation method according to an embodiment of the present invention. FIG. 20 is an operation flowchart showing an example of the sound source information extraction step shown in FIG. 19. FIG. 21 is an operation flowchart showing an example of the intent information generation step shown in FIG. 19. FIG. 22 is an operation flowchart showing another example of the intent information generation step shown in FIG. 19. FIG. 23 is an operation flowchart showing an example of the recommended sound source provision step shown in FIG. 19.

FIGS. 19 to 23 may illustrate embodiments of a sound source recommendation method performed by the sound source recommendation device 100 described with reference to FIGS. 15 to 18. Since a description has been made in detail with reference to FIGS. 15 to 18, the sound source recommendation method performed by the sound source recommendation device 1410 will be described in brief.

Referring to FIG. 19, the sound source recommendation device 1410 may collect the sound source listening history information of each user at step S1910. Here, the sound source listening history information of the user may be collected during a preset period, and a change in the preference of the user may be reflected via the collection of the sound source listening history information. Further, the sound source listening history information of the user may include information about the titles of pieces of music listened to by the user during a predetermined period, the number of times each piece of music was listened to, etc., as described above.

Then, sound source information may be extracted based on the sound source listening history information at step S1920.

Referring to FIG. 20, the sound source information extraction step S1920 will be described in greater detail. First, when the sound source listening history information of the user is collected, the number of sound sources listened to by the user may be calculated based on the sound source listening history information at step S2010. Here, as described above in detail with reference to Table 1, the number of sound sources listened to may be calculated in consideration of one or more of the number of sound sources listened to by the user during a predetermined period and the number of times each sound source was listened to.

Then, the calculated number of sound sources listened to is compared with a preset reference value, and then sound source information extraction targets may be determined at step S2015. That is, when, as a result of the comparison, the number of sound sources listened to is less than the preset reference value, it is determined that the listening history collected for the user is not sufficient, and then sound source information is to be extracted from the sound source listening history information of other users. In contrast, when, as a result of the comparison, the number of sound sources listened to is not less than the preset reference value, it may be determined that the sound source listening history collected for the user is sufficient, and sound source information is to be extracted from the sound source listening history information of the user.

Then, when sound source information is determined to be extracted from the sound source listening history information of the user, the sound source information may be extracted based on the sound source listening history information of the user at step S2020.

If it is determined at step S2015 that the sound source information is to be extracted from the sound source listening history information of other users, one or more users similar to the user may be extracted at step S2030. It is possible to calculate the extent of overlap with sound sources listened to by other users, based on the sound source listening history information collected for the corresponding user and extract, as similar users, a preset number of users, from users who have listened to a high number of sound sources in common based on the calculated extent of overlap of sound sources.

Next, the sound source information of the user may be extracted based on the sound source listening history information of the similar users at step S2040.

Referring back to FIG. 19, the intent information of the user may be generated based on the extracted sound source information at step S1930. Here, the intent information may include a lyrical preference, a theme preference, a chord change preference, a melody/rhythm change preference, an artist/genre preference, etc.

FIG. 21 illustrates an embodiment in which a lyrical preference or a theme preference is calculated using the lyrics information of the sound source information, extracted at step S1930.

Referring to FIG. 21, one or more keywords may be extracted from the entire lyrics of each sound source listened to by the user using the lyrics information at step S2110.

Next, a first frequency at which each extracted keyword appears in the entire lyrics may be obtained at step S2120, and the lyrical preference may be calculated using the first frequency at step S2160.

Here, when there is a need to calculate the lyrical preference by assigning predetermined weights to respective keywords at step S2125, a second frequency, at which each keyword appears in the highlight or refrain of the sound source, is obtained at step S2130, and weights to be assigned to the respective keywords may be determined based on the second frequency at step S2140. Next, when the weights are determined, the weights are applied to the first frequency or the second frequency in consideration of preset lyrical preference calculation criteria, and thus the lyrical preference may be calculated at step S2150.

Next, when there is theme-based word association information that has been constructed in advance for all recommendable sound sources at step S2115, frequencies at which each keyword appears for respective themes are obtained at step S2170, and the theme preference may be calculated based on the obtained frequencies for respective themes at step S2180.

FIG. 22 illustrates an embodiment in which a chord change preference or a melody/rhythm change preference is calculated using the chord information or the melody/rhythm information of the sound source information extracted at step S1920.

Referring to FIG. 22, sound source information is checked at step S2205. When the sound source information is chord information, chord change information, such as that illustrated in Table 3, may be extracted based on the chord information at step S2210.

Next, a chord change frequency at which each chord change appears in all sound sources listened to by the user is obtained at step S2220, and the chord change preference may be calculated based on the obtained chord change frequency at step S2230.

As a result of checking the sound source information at step S2205, if the sound source information is melody/rhythm information, one or more pieces of melody/rhythm change information may be extracted based on the melody/rhythm information, as illustrated in Table 4, at step S2240.

Next, a melody/rhythm change frequency at which each melody/rhythm change appears in all sound sources listened to by the user is obtained at step S2250, and the melody/rhythm change preference may be calculated using the obtained melody/rhythm change frequency at step S2260.

Referring back to FIG. 19, recommendation sound sources may be provided to the user using the user's intent information at step S1940.

Step S1940 is described in greater detail with reference to FIG. 23. One or more recommendation sound sources may be selected from among all recommendable sound sources at step S2310. Here, the recommendation sound sources may be selected in consideration of various criteria using the lyrical preference, theme preference, chord change preference, melody/rhythm change preference, artist/genre preference, etc., which are generated for the user or, alternatively, sound sources matching keywords entered by the user may be selected as the recommendation sound sources.

Then, when the recommendation sound sources are selected, the exposure ranking of the selected recommendation sound sources may be determined using the user's intent information at step S2320. Here, the exposure ranking may be determined by combining one or more, or two or more, of pieces of intent information generated for the user, for example, a lyrical preference, a theme preference, a chord change preference, and a melody/rhythm preference.

Thereafter, when the exposure ranking has been determined, the recommendation sound sources may be aligned depending on the exposure ranking at step S2330, and the results of the alignment may be provided to the user at step S2340.

Next, when the recommendation sound sources to be recommended to the user are selected at step 701, the reason for the recommendation is generated based on the reason for selecting the recommendation sound sources, and may be provided to the user at step S2350. In this regard, the reason for the recommendation may be provided together with the recommendation sound sources.

Computer-readable media suitable for the storage of program instructions and data, for example, storage media, may include magnetic media such as a hard disk, a floppy disk, and magnetic tape, optical media such as Compact Disk Read Only Memory (CD-ROM) and a Digital Video Disk (DVD), magneto-optical media such as a floptical disk, and semiconductor memory such as ROM, Random Access Memory (RAM), flash memory, Erasable Programmable ROM (EPROM), and Electrically Erasable Programmable ROM (EEPROM). A processor and memory may be supplemented by or integrated into a special-purpose logic circuit. Examples of the program instructions include machine language code, such as code created by a compiler, and high-level language code executable by a computer using an interpreter or the like. Such hardware devices may be configured to operate as one or more software modules in order to perform the operation of the present invention, and vice versa.

The present specification includes detailed items of a plurality of specific embodiments, but they should not be understood to be restrictive even in any invention or claimable scope, and should be rather understood to describe the features peculiar to a specific embodiment of a specific invention. In the context of individual embodiments, the specific features described in the present specification may be combined and implemented in a single embodiment. In contrast, various features described in the context of a single embodiment may also be implemented in multiple embodiments in an individual form or in the form of any suitable low-level combinations. Furthermore, although features may be operated in a specific combination and may be described as initially claimed, one or more features from the claimed combinations may be excluded from the combinations in some cases, and the claimed combinations may be changed to subordinate combinations or modifications of the subordinate combinations.

Similarly, although operations have been described in a specific sequence in the drawings, it should not be understood that those operations must be performed either in an illustrated specific sequence or sequentially, or that all illustrated operations must be performed, in order to obtain preferred results. In a specific case, multitasking and parallel processing may be profitable. Further, it should not be understood that the separation of various system components in the above-described embodiments is required in all embodiments, and it should be understood that the above-described program components and systems may be generally integrated into a single software product or may be packaged in multiple software products.

Meanwhile, the embodiments of the present invention disclosed in the present specification and drawings are merely intended to present specific examples so as to help the understanding of the invention, and are not intended to limit the scope of the present invention. It is apparent to those skilled in the art to which the present invention pertains that, in addition to the embodiments disclosed here, other modifications based on the technical spirit of the invention can be practiced.

INDUSTRIAL APPLICABILITY

In accordance with the present invention, a device for recommending suitable content in a device such as a TV used by a plurality of users is disclosed. In accordance with embodiments of the present invention, there is no need to collect separate profile information or the like to recommend customized content information to a plurality of users by recommending content for each channel group provided via a TV, rather than recommending content to each of a plurality of users, thus enabling the utilization of the present invention to be increased.

Further, in accordance with the present invention, there is disclosed technology for providing sound sources suitable for a user and the reason for recommending the sound sources to the user based on the sound source usage history of the user. In accordance with embodiments of the present invention, information about the lyrics of sound sources and changes in rhythm, melody, and chords may be extracted from the sound source usage history, and the user's intent is determined based on the extracted information, so that suitable sound sources may be recommended and various reasons for recommending the sound sources may be provided together with the sound sources, thus allowing the user to receive recommendation sound sources suitable for his or her preference, with the result that the utilization of the invention may be increased.

The invention claimed is:

1. A content recommendation device including at least one processor and a non-transitory computer-readable medium storing instructions that, when executed by the at least one processor, cause the content recommendation device to:
    calculate a similarity between channels by causing the recommendation device to:
        check content overlap information indicating overlap between pieces of content on the channels using collected broadcast information; and
        calculate the similarity between the channels based on the content overlap information and attribute information of the channels;
    generate one or more channel groups in a hierarchical tree having several levels by comparing the calculated similarity between the channels with a preset threshold, merging the channels into one or more channel groups based on a result of the comparison, wherein the several levels includes first level and second level;
    convert content viewing history information for each user group into viewing history information for each of the channel groups;
    generate content recommendation information for each channel group for each user group, based on the viewing history information for each channel group;
    provide content recommendation information for each channel group, generated for each user group, to the user group by causing the recommendation device to:
        receive, in real time, a signal including channel information about a channel on which each user group is currently viewing content or a new channel when the channel is changed for viewing; and
        provide the content recommendation information based on the received channel information in response to the received signal;
    calculate, for a respective channel, a belongingness value for a broadcasted content on the respective channel, wherein when the broadcasted content corresponds to a particular content belonging to a main genre of specialty channel, the broadcasted content is determined to have a higher belongingness value to the specialty channel compared to other channels;
    wherein each broadcasted content is determined to belong to different channel groups depending on their respective belongingness value;
    wherein when the broadcasted content is determined to belong to two or more channels based on the calculated belongingness value of the broadcasted content and the two or more channels belong to different channel groups, the instructions, when executed by the at least one processor, further cause the content recommendation device to generate an upper channel group for the different channel groups, wherein a number of generated upper channel groups is greater than a number of channels; and
    wherein the content overlap information comprises information about a number of pieces of overlapping content.

2. The content recommendation device of claim 1, wherein the instructions, when executed by the at least one processor, further cause the content recommendation device to:
    collect broadcast information including one or more of Electronic Program Guide (EPG) information for each channel, meta-information for each channel, meta-information of content broadcasted on each channel, and web information; and
    generate attribute information of each channel using the collected broadcast information.

3. The content recommendation device of claim 1, wherein the instructions, when executed by the at least one processor, further cause the content recommendation device to:
    calculate a content preference for each channel group based on the viewing history information for each channel group, and
    generate content recommendation information for each channel group based on the calculated content preference.

4. The content recommendation device of claim 2, wherein the instructions, when executed by the at least one processor, further cause the content recommendation device to: provide content recommendation information for a channel group, to which a channel currently selected by each user group belongs, to a corresponding user group.

5. The content recommendation device of claim 2, wherein the instructions, when executed by the at least one processor, further cause the content recommendation device to:
    calculate belongingness of pieces of content broadcasted on respective channels to the respective channels, when the broadcasted content corresponds to a particular content belonging to main genre of specialty channel, the broadcasted content has high belongingness to the specialty channel than other channels,
    wherein each piece of content belongs to different channel groups depending on the belongingness thereof, when content currently being viewed on a particular channel has higher belongingness to another channel group, content recommendation information for the channel group having the higher belongingness is provided,
    wherein the instructions cause the content recommendation device to provide content recommendation information for the channel groups at the first level with higher priority, and provide content recommendation information for the channel group at the second level with priority lower than the first level.

6. A method implemented by a content recommendation device including a processor and a non-transitory computer-readable medium storing instructions, the method comprising:
- calculating a similarity between channels by:
  - checking content overlap information about overlap between pieces of content on the channels using collected broadcast information; and
  - calculating the similarity between the channels, based on the content overlap information and attribute information of the channels;
- generating one or more channel groups in a hierarchical tree having several levels by comparing the calculated similarity between the channels with a preset threshold, merging the channels into one or more channel groups based on a result of the comparison, wherein the several levels includes first level and second level;
- converting content viewing history information for each user group into viewing history information for each of the channel groups;
- generating content recommendation information for each channel group for each user group, based on the content viewing history information for each channel group;
- providing the content recommendation information to each user group by:
  - receiving, in real time, a signal including channel information about a channel on which each user group is currently viewing content or a new channel when the channel is changed for viewing; and
  - providing the content recommendation information based on the received channel information in response to the received signal;
- calculating, for a respective channel, a belongingness value for a broadcasted content on the respective channel, wherein when the broadcasted content corresponds to a particular content belonging to a main genre of specialty channel, the broadcasted content is determined to have a higher belongingness value to the specialty channel compared to other channels;
- wherein when the broadcasted content is determined to belong to two or more channels based on the calculated belongingness value of the broadcasted content and the two or more channels belong to different channel groups, generating an upper channel group for the different channel groups, wherein a number of generated upper channel groups is greater than a number of channels; and
- wherein the content overlap information comprises information about a number of pieces of overlapping content.

* * * * *